United States Patent
Wang et al.

(10) Patent No.: US 11,694,134 B2
(45) Date of Patent: Jul. 4, 2023

(54) OPTIMIZATION METHOD AND DEVICE OF CREW REPLANNING FOR HIGH-SPEED RAILWAY IN TYPICAL SCENARIOS

(71) Applicant: BEIJING JIAOTONG UNIVERSITY, Beijing (CN)

(72) Inventors: Ying Wang, Beijing (CN); Jinchuan Zhang, Beijing (CN); Jianrui Miao, Beijing (CN); Lingyun Meng, Beijing (CN); Xinyue Xu, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 0 days.

(21) Appl. No.: 17/848,302

(22) Filed: Jun. 23, 2022

(65) Prior Publication Data

US 2022/0327462 A1  Oct. 13, 2022

(30) Foreign Application Priority Data

Jun. 28, 2021 (CN) .......................... 202110715764.9

(51) Int. Cl.
*G06Q 10/0631* (2023.01)
*G06Q 10/047* (2023.01)

(52) U.S. Cl.
CPC ............. *G06Q 10/063116* (2013.01); *G06Q 10/047* (2013.01)

(58) Field of Classification Search
CPC ............. G06Q 10/063116; G06Q 10/047
See application file for complete search history.

(56) References Cited

U.S. PATENT DOCUMENTS

| 2008/0109124 A1 | 5/2008 | Daum et al. |
| 2011/0112877 A1 | 5/2011 | Govind et al. |
| 2018/0032964 A1 | 2/2018 | Gkiotsalitis et al. |

FOREIGN PATENT DOCUMENTS

| CN | 102542404 A | 7/2012 |
| CN | 109508809 A | 3/2019 |
| CN | 110288168 A | 9/2019 |
| CN | 110490440 A | 11/2019 |
| CN | 110751358 A | 2/2020 |
| CN | 111547113 A | 8/2020 |
| CN | 112101686 A | 12/2020 |

OTHER PUBLICATIONS

Caprara et al., Algorithms for railway crew management, Mathematical Programming 79 (1997) pp. 125-141. (Year: 1997).*
Ceria et al., A Langrangian-based heuristic for large-scale set covering problems, Mathematical Programming 81 (1998) pp. 215-228. (Year: 1998).*
Abbink et al,. Solving large scale crew scheduling problems in practice, Public Transp (2011) 3, pp. 149-164. (Year: 2011).*

(Continued)

*Primary Examiner* — Nadja N Chong Cruz

(57) ABSTRACT

Provided herein are a method and device of crew replanning for high-speed railway typical scenarios, and an electronic device and a computer-readable storage medium. The method includes: building a high-speed railway crew connection network; establishing a model for high-speed railway crew replanning; decomposing the model into a first sub-model for team leaders and a second sub-model for general crew members; and designing a Lagrangian relaxation algorithm to solve the first sub-model and the second sub-model.

6 Claims, 5 Drawing Sheets

(56) References Cited

OTHER PUBLICATIONS

Dauzère-Pérèz et al., A Lagrangian heuristic framework for a real-life integrated planning problem of railway transportation resources, Transportation Reseach Part B 74 (2015) pp. 138-150. (Year: 2015).*
Fuentes et al., A new approach to crew scheduling in rapid transit networks, Transportation Research Procedia 10 (2015) pp. 554-563. (Year: 2015).*
Zhang et al., Joint optimization of train scheduling and maintenance planning in a railway network: A heuristic algorithm using Lagrangian relaxation, Transportation Research Part B 134 (2020) pp. 64-92. (Year: 2020).*
Zhou et al., Integrated optimization approach to metro crew scheduling and rostering, Transportation Research Part C 123 (2021) 102975. Available online Feb. 3, 2021. (Year: 2021).*
Ying Wang, Zheming Zhang, Dennis Huisman, Andrea D'ariano, Jinchuan Zhang; A Lagrangian Relaxation Approach Based on a Time-Space-State Network for Railway Crew Scheduling; Econometric Institute Research Papers, 2018, 1-24; School of Traffic and Transportation, Beijing Jiaotong University, Beijing 100044, China.
Yang Guo-Yuan, Shi Tian-Yun, Zhang Qiu-Liang; Model and Algorithm for Railway Passenger Crew Rostering Plan; Journal of Transportation Systems Engineering and Information Technology, vol. 16 No. 4, Aug. 2016; China Academy of Railway Sciences, Beijing 100081, China.
Wang Ying, Liu Jun, Miao Jianrui; A Heuristic Approach for Crew Rostering Problem Based on Equivalent Crew Duties Set; Journal of Transport Information and Safety, vol. 30 No. 167, Feb. 2012; School of Traffic and Transportation, Beijing Jiaotong University, Beijing 100044, China.

* cited by examiner

OPTIMIZATION METHOD AND DEVICE OF CREW REPLANNING FOR HIGH-SPEED RAILWAY IN TYPICAL SCENARIOS

CROSS-REFERENCE TO RELATED APPLICATIONS

This application claims the benefit of priority from Chinese Patent Application No. 202110715764.9, filed on Jun. 28, 2021. The content of the aforementioned application, including any intervening amendments thereto, is incorporated herein by reference in its entirety.

TECHNICAL FIELD

This application relates to high-speed railway crew scheduling, and more specifically to an optimization method and device of crew replanning for high-speed railway typical scenarios, and an electronic device and a computer-readable storage medium.

BACKGROUND

Crew scheduling is an important part of railway passenger transport operation management, is directly associated with the service quality of passenger transportation and the safety of train operation. With the rapid development of the high-speed railway in China, crew replanning during railway operation becomes increasingly frequent. Due to the unique operation and organization complexity, the high-speed railway has higher requirements for crew replanning. How to scientifically and reasonably replan the crew scheduling to achieve the scientific decision-making and overall management is urgently needed to be solved in the high-speed railway operation and management.

Traditionally, the crew scheduling plan is established manually, which often struggles with large labor intensity, low efficiency and poor accuracy, and thus fails to meet the current requirements of the high-speed railway operation and development. In some cases, a real-time adjustment is required to be made to the crew scheduling, which requires higher professional competence. In view of this, the manual establishment generally cannot arrive at the desired crew scheduling, thereby seriously affecting the service quality and the subsequent crew scheduling.

However, the existing researches mainly focus on the anonymous crew replanning, and it has been rarely studied on crew replanning for each crew member. Moreover, the existing researches are predominated by the flight crew replanning, in which with the replanning period set to one day, and a multi-commodity flow model with an objective of cost minimization is established for optimizing crew replanning in combination with preprocessing, D-W decomposition and branch-and-bound algorithm. Among the relatively few railway crew replanning methods, the train delay is mainly used as a scenario for the crew replanning, and solved through column generation and Lagrangian relaxation. The existing researches fail to take the following factors in to consideration: the current working status of individual crew members, the individual difference between crew members, the cooperating preference of different crew members, and the responsibility preference of each crew member. In addition, the replanned crew rostering also needs to be artificially delivered to each crew member, failing to enable the completely automatic replanning.

SUMMARY

In order to solve the problems mentioned above, the present disclosure provides an optimization method and device of crew replanning for high-speed railway typical scenarios, and an electronic device and a computer-readable storage medium.

The technical solutions of the present disclosure are described as follows.

In a first aspect, this application provides an optimization method of crew replanning for high-speed railway typical scenarios, comprising:

(1) building a high-speed railway crew connection network;

(2) establishing a model for high-speed railway crew replanning;

(3) decomposing the model into a first sub-model for team leaders and a second sub-model for general crew members; and (4) designing a Lagrangian relaxation algorithm to solve the first sub-model and the second sub-model;

wherein the high-speed railway crew connection network is built through steps of:

performing node establishment; and establishing a connection arc;

wherein the node establishment comprises steps of:

denoting a day before a start of a scheduling cycle as d=0; denoting moment 0:00 of d=0 as time zero, in minutes; wherein for $\forall e \in E$, a start time $t_{de}^{start}$ is expressed as $t_{de}^{start} = t_e^{start} + 1440 \times d_e$, and an end time $t_{de}^{end}$ is expressed as $t_{de}^{end} = t_e^{end} + 1440 \times d_e$; for $\forall e_T \in E_T$, a start time $t_{de_T}^{start}$ is expressed as $t_{de_T}^{start} = t_{e_T}^{start} 1440 \times 4 d_{e_T}$, and an end time $t_{de_T}^{end}$ is expressed as $t_{de_T}^{end} = t_{e_T}^{end} + 1440 \times d_{e_T}$; and establishing nodes respectively corresponding to an initial state of each crew member, a crew duty of each day within the scheduling cycle and a replanning crew duty according to schedule day;

the node establishment further comprises:

establishing virtual crew base source nodes $m_1^O$, $m_2^O$, ..., $m_n^O$ for all crew bases in a crew area involved in crew scheduling, respectively, and denoting a set of the virtual crew base source nodes as $V_O$; wherein there is a unique crew base for $\forall r \in R$;

establishing virtual crew base end nodes $m_1^D$, $m_2^D$, ... $m_n^D$ for all crew bases in the crew area involved in the crew scheduling, respectively, and denoting a set of the virtual crew base end nodes as $V_D$; and for $\forall e \in R$, $d_e \in \{d | d=1 \ldots N_D-1\}$ and $\forall e_T \in E_T$, $d_{e_T} \in \{d | d=1 \ldots N_D-1\}$, establishing an intermediate node $v_e^d$ corresponding to the crew duty and an intermediate node $v_{e_T}^d$ of the replanning crew duty; wherein the intermediate node $v_e^d$ and the intermediate node $v_{e_T}^d$ each has seven attributes, respectively start position, start time, end position, end time, duration, schedule day serial number and crew preference;

denoting a set of intermediate nodes of all crew duties in the scheduling cycle as $V_{mid}^E$;

denoting a set of intermediate nodes of all replanning crew duties as $V_{mid}^T$;

denoting a set of all intermediate nodes as $V_{mid}$; and denoting a set of all nodes as V;

wherein R represents a set of all crew members; r is any one of all crew members; D is a set of all schedule days in the scheduling cycle, $D = \{d | d=1, 2, 2, \ldots, N_D\}$, wherein d is any one of the schedule days, and $N_D$ is the total number of days in the scheduling cycle;

E represents a set of all crew duties in the scheduling cycle; e is any one of all crew duties; $s_e^{start}$ is a start position of the crew duty e; $s_e^{end}$ is an end position of the crew duty e; $t_e^{start}$ is a start time of the crew duty e; $t_e^{end}$ is an end time of the crew duty e; $t_e$ is a duration of the crew duty e; $d_e$ represents a schedule day serial number of the crew duty e; and $k_e$ represents the crew preference of the crew duty e;

$E_T$ represents a set of all replanning crew duties in the scheduling cycle; $e_T$ is any one of all replanning crew duties; $s_{e_T}^{start}$ of the replanning crew duty $e_T$; $s_{e_T}^{end}$ is an end position of the replanning crew duty $e_T$; $t_{e_T}^{start}$ represents a start time of the replanning crew duty $e_T$; $t_{e_T}^{end}$ represents an end time of the replanning crew duty $e_T$; $t_{e_T}$ represents a duration of the replanning crew duty $e_T$; $d_{e_T}$ represents a schedule day serial number of the replanning crew duty $e_T$; and $k_{e_T}$ represents the crew preference of the replanning crew duty $e_T$; and $m_n$ represents a crew base, wherein n is a positive integer; wherein the connection arc is established as follows:

a) for $\forall r \in R$, if a crew base to which the crew member r belongs is the same as a start position of $\forall e \in E$ and $\forall e_T \in E_T$, and the crew member r conforms to a preference of $\forall e \in E$ and $\forall e_T \in E_T$ for crew member, establishing a crew On-duty arc $(m_n^o, v_e^d)$ between a virtual crew base source node $m_n^o$ and the intermediate node $v_e^d$, or establishing a crew On-duty arc $(m_n^o, v_{e_T}^d)$ between the virtual crew base source node $m_n^o$ and the intermediate node $V_{e_T}^d$; and denoting a set of all crew On-duty arcs as $A_{On\text{-}duty}$;

b) from the schedule day d=0 to schedule day d=$N_D$−1, for any one-day crew duty and replanning crew duty, if end position of a previous crew duty is the same as start position of a next crew duty, establishing a crew connection arc $(v_{e_1}^d, v_{e_1}^d)$ between an intermediate node $v_{e_1}^d$ and an intermediate node $v_{e_2}^d$, a crew connection arc $(v_{e_T}^d, v_e^d)$ between the intermediate node $v_e^d$ and the intermediate node $v_e^d$, or a crew connection arc $(v_e^d, v_{e_T}^d)$ between the intermediate node $v_e^d$ and the intermediate node $V_{e_T}^d$; and denoting a set of all crew connection arcs as $A_{connection}$;

c) from the schedule day d=0 to the schedule day d=$N_D$−1, for $\forall r \in R$, when the end position of an intermediate node, which crew r completed, is different from a start position of the next intermediate node to be completed but the same as a start position of the another intermediate node, establishing a deadheading arc $(v_{e_i}^d, v_{e_1}^d)$ between the intermediate node $V_{e_i}^d$ and the intermediate node $v_{e_2}^d$, a deadheading arc $(v_{e_T}^d, v_e^d)$ between the intermediate node $v_e^d$ and the intermediate node $v_e^d$, or a deadheading arc $(v_e^d, v_{e_T}^d)$ between the intermediate node $v_e^d$ and the intermediate node $v_{e_T}^d$ and denoting a set of all deadheading arcs as $A_{deadheading}$;

d) for $\forall r \in R$, if the crew base to which the crew member r belongs is the same as an end position of $\forall e \in E$ and $\forall e_T \in E_T$, and the crew member r conforms to the crew preference of $\forall e \in E$ and $\forall e_T \in E_T$, for crew member, establishing a crew Off-duty arc $(v_e^d, m_n^D)$ between a virtual crew base end node $m_n^D$ and the intermediate node $v_e^d$, or a crew Off-duty arc $(v_{e_T}^d, m_n^D)$ between the virtual crew base end node $m_n^D$ and the intermediate node $v_{e_T}^d$; and denoting a set of all crew Off-duty arcs as $A_{Off\text{-}duty}$;

e) denoting a set of all arcs as A; and wherein the high-speed railway crew connection network is expressed as N(V,A).

In an embodiment, the step of "establishing a model for high-speed railway crew replanning" comprises:

establishing an objective function of the model;

wherein an optimization objective of the model is to minimize cost of replanned crew scheduling, and the objective function is expressed as:

$$\min \sum_{r \in R} \sum_{p \in P_r} c_p^r x_p^r + \sum_{i \in N^C} f_i y_i + \sum_{r \in R^G} \sum_{i \in N^G} h_i^r z_i^r;$$

wherein $N^C$ is a set of crew tasks of all crew members; $N^G$ is a set of crew tasks of general crew members; $P_r$ represents a set of feasible crew pairings for the crew member r; p is any one of the crew pairings; $c_p^r$ represents cost required for the crew pairing $p \in P_r$; $x_p^r$ is a 0-1 decision variable; if the crew member $r \in R$ undertakes the crew pairing $p \in P_r$, $x_p^r$ is equal to 1; otherwise, $x_p^r$ is equal to 0; i represents a crew task, $f_i$ represents a penalty cost when the crew task i is assigned to one less crew member, and one less crew member is allowed; $y_i$ is a 0-1 decision variable, wherein if one less crew member is assigned to perform the crew task $i \in N^c$, $y_i$ is equal to 1; otherwise, $y_i$ is equal to 0; $R^G$ is a set of the general crew members; $h_i^r$ represents a penalty cost when the crew member r does not undertake the crew task i with a corresponding leader; and $z_i^r$ is a 0-1 decision variable, wherein if the crew member $r \in R^G$ does not undertake the crew task $i \in N^G$ with the corresponding leader, $z_i^r$ is equal to 1; otherwise, $z_i^r$ is equal to 0;

the cost $c_p^r$ is calculated as follows:

$$c_p^r = \alpha_r + \sum_{i \in N_p} \beta_i b_{pi}^r + \sum_{i \in N_p} \mu_i a_{pi}^r + \eta_r \delta_p^r;$$

wherein $\alpha_r$ represents a penalty value for the crew member r when deviating from an original crew pairing; $N_P$ represents a set of crew tasks included in the crew pairing p; $\beta_i$ represents a cost when crew members deadhead as passengers to the crew task; $bp_{pi}^r$ is a 0-1 variable, wherein if the crew member r is added as a passenger to the crew task i in the crew pairing p, $b_{pi}^r$ is equal to 1; otherwise, $b_{pi}^r$ is equal to 0; $\mu_i$ represents a cost of matching preference of the crew task i; $\alpha_{pi}^r$ is a 0-1 variable, wherein if the crew pairing $p \in P_r$ comprises the crew task $i \in N$, $\alpha_{pi}^r$ is equal to 1; otherwise, $\alpha_{pi}^r$ is equal to 0; $\eta_r$ represents a penalty coefficient of deviated monthly working hours of the crew member r; and $\delta_p^r$ represents deviated of the monthly working hours of the crew member r when undertaking the crew pairing p.

In an embodiment, the step of "establishing a model for high-speed railway crew replanning" further comprises:

establishing constraints for the model;

wherein the constraints include:

a) crew pairing unique constraint, any one of crew members is allowed to choose only one crew pairing during the scheduling cycle, expressed as follows:

$$\sum_{p \in P_r} x_p^r = 1, \forall r \in R;$$

b) a crew task coverage constraint, for all crew tasks of the leader, all crew tasks of cabin crew members and all crew tasks of safety personnel, there is a matching crew member, expressed as follows:

$$\sum_{r \in R^L} \sum_{p \in P_r} a_{pi}^r x_p^r = g_i^L, \forall i \in N^L;$$

$$\sum_{r \in R^C} \sum_{p \in P_r} a_{pi}^r x_p^r + y_i = g_i^C, \forall i \in N^C; \text{ and}$$

$$\sum_{r \in R^S} \sum_{p \in P_r} a_{pi}^r x_p^r = g_i^S, \forall i \in N^S;$$

c) a crew member preference constraint, when arranging a task with crew preference, it is needed to meet the crew preference, expressed as follows:

$$\sum_{r \in R^G} \sum_{p \in P_r} e_{pi}^{rk} x_p^r \geq d_i^k, \forall k \in K, i \in N^G;$$

d) cabin and leader matching constraints, a leader-crew matching constraint, expressed as follows:

$$\sum_{p \in P_r} a_{pi}^r x_p^r - \sum_{p \in P_{\pi(r)}} a_{p\sigma(i)}^{\pi(r)} x_p^{\pi(r)} \leq z_i^r, \forall r \in R^G, i \in N^G;$$

wherein when the crew member $r \in R^G$ does not undertake the crew task $i \in N^G$ together with the corresponding leader $\pi(r)$, $z_i^r = 1$; and e) a decision variable constraint:

$$x_p^r \in \{0,1\}, \forall r \in R, p \in P_r;$$

$$y_i \in \{0,1\}, \forall i \in N^C; \text{ and}$$

$$z_i^r \in \{0,1\}, \forall r \in R^G, i \in N^G;$$

wherein $R^L$ represents a set of leaders; represents the number of leaders required to undertake the crew task $i \in N$; $N^L$ represents a set of crew tasks of the leader; $R^C$ represents a set of cabin; $g_i^C$ represents the number of cabins required to undertake the crew task $i \in N$; $R^S$ represents a set of the safety personnel; $g_i^S$ represents the number of the safety personnel required to undertake the crew task $i \in N$. $N^S$ represents a set of crew tasks of the safety personnel; $e_{pi}^{rk}$ represents a known 0-1 variable, which indicates that the crew task $i \in N^G$ in the crew pairing p has a preference $k \in K$ for the crew member r; if the preference points to males, when the crew member r is male, $e_{pi}^{rk}$ is equal to 1; otherwise, $e_{pi}^{rk}$ is equal to 0; $d_i^k$ represents a threshold of the preference k of the crew task i; if the preference points to males, the threshold is equal to the number of male crew members required by the crew task i; K represents a set of preferences of the crew task to crew member assignment; k is any one of the set of preferences; $\pi(r)$ represents the leader in a crew team corresponding to any general crew member $r \in R^G$, and $\pi(r) \in R^L$; $P_{\pi(r)}$ represents a set of feasible crew pairings of a leader $\pi(r)$ corresponding to the crew member r; $\alpha_{p\sigma}^{\pi(r)}$ is a 0-1 variable, wherein if the crew pairing $p \in P_{\pi(r)}$ comprises a crew task $\sigma(i) \in N$, $\alpha_{p\sigma(i)}^{\pi(r)}$ is equal to 1; otherwise, $\alpha_{p\sigma(i)}^{\pi(r)}$ is equal to 0; and $x_p^{\pi(p)}$ s a 0-1 decision variable, wherein if the crew pairing p undertaken by the leader $\pi(r)$ corresponding to the crew member $r \in R$ belongs to $P_{\pi(r)}$, $x_p^{\pi(r)}$ is equal to 1; otherwise, $x_p^{\pi(p)}$ is equal to 0.

In an embodiment, the first sub-model is configured to complete leader crew tasks, and an optimization objective of the first sub-model is to minimize a cost of completing the leader crew tasks, expressed as $$\min \sum_{r \in R^L} \sum_{p \in P_r} c_p^r x_p^r;$$

wherein constraints of the first sub-model include:

a) crew pairing unique constraint, any one of leaders is allowed to choose only one crew pairing during the scheduling cycle, expressed as follows:

$$\sum_{p \in P_r} x_p^r = 1, \forall r \in R^L;$$

b) a crew task coverage constraint, for any one of the leader crew tasks, there is a matching leader to undertake, expressed as follows:

$$\sum_{r \in R^L} \sum_{p \in P_r} a_{pi}^r x_p^r = g_i^L, \forall i \in N^L;$$

and c) a decision variable constraint, expressed as follows:

$$x_p^r \in \{0,1\}, \forall r \in R^L, p \in P_r;$$

wherein the second sub-model is configured to complete the crew tasks of general crew members, and an optimization objective of the second sub-model is to minimize a cost of completing the crew tasks of general crew members, expressed as follows:

$$\min \sum_{r \in R^G} \sum_{p \in P_r} \hat{c}_p^r x_p^r + \sum_{i \in N^C} f_i y_i;$$

wherein since the scheduling of the leader is determined after the first sub-model is solved, a value of $z_i^r$ can be determined according to the scheduling of the general crew members, so as to obtain a cost $\hat{c}_p^r$ for a general crew member r to undertake the crew pairing p expressed as:

$$\hat{c}_p^r = c_p^r + \sum_{i \in N_p} h_i^r z_i^r;$$

constraints of the second sub-model include:

a) crew pairing unique constraint, any one of general crew members is allowed to choose only one crew pairing during the scheduling cycle, expressed as follows:

$$\sum_{p \in P_r} x_p^r = 1, \forall r \in R^G;$$

b) a crew task coverage constraint, for any one of the crew tasks of general crew members, there is a matching general crew member to undertake, expressed as follows:

$$\sum_{r \in R^C} \sum_{p \in P_r} a_{pi}^r x_p^r + y_i = g_i^C, \forall i \in N^C; \text{ and}$$

$$\sum_{r \in R^S} \sum_{p \in P_r} a_{pi}^r x_p^r = g_i^S, \forall i \in N^S;$$

c) a crew member preference constraint, wherein when arranging a crew task with a crew member preference, it is needed to meet the crew member preference, expressed as follows:

$$\sum_{r \in R^G} \sum_{p \in P_r} e_{pi}^{rk} x_p^r \geq d_i^k, \forall k \in K, i \in N^G;$$

and d) a decision variable constraint, expressed as follows:

$$x_p^r \in \{0,1\}, \forall r \in R^G, p \in P_r; \text{ and}$$

$$y_i \in \{0,1\}, \forall i \in N^C.$$

In an embodiment, the crew task coverage constraint in the first sub-model is relaxed and added into the objective function as a penalty item, and the crew task coverage constraint in the second sub-model and the crew member preference constraint are relaxed and added into the objective function as penalty items;

wherein the first sub-model with the crew task coverage constraint relaxed is expressed as:

$$\Theta^L(\lambda) = \sum_{r \in R^L} \sum_{p \in P^r} \left( c_p^r - \sum_{i \in N^L} \lambda_i^L d_{pi}^r \right) x_p^r + \sum_{i \in N^L} \lambda_i^L g_i^L;$$

$$\text{s.t.} \sum_{p \in P_r} x_p^r = 1, \forall r \in R^L; \text{ and}$$

$$x_p^r \in \{0, 1\}, \forall r \in R^L, p \in P_r;$$

wherein $\lambda_i^L$ is a Lagrange multiplier, indicating a cost generated when the leader L undertakes the crew task i;

the second sub-model with the crew task coverage constraint and the crew member preference constraint relaxed is expressed as:

$$\Theta^G(\lambda, \gamma) = \sum_{r \in R^G} \sum_{p \in P^r} \left( c_p^r - \sum_{i \in N^G} \lambda_i^G d_{pi}^r - \sum_{k \in K} \sum_{i \in N^G} \gamma_i^k e_{pi}^{rk} \right) x_p^r +$$

$$\sum_{i \in N^C} (f_i - \lambda_i^C) y_i + \sum_{i \in N^G} \lambda_i^G g_i^G + \sum_{k \in K} \sum_{i \in N^G} \gamma_i^k d_i^k;$$

$$\text{s.t.} \sum_{p \in P_r} x_p^r = 1, \forall r \in R^G;$$

$$x_p^r \in \{0, 1\}, \forall r \in R^G, p \in P_r; \text{ and}$$

$$y_i \in \{0, 1\}, \forall i \in N^C;$$

wherein $\lambda_i^C$, $\lambda_i^G$ and $\gamma_i^k$ are respectively a Lagrange multiplier, indicating the cost generated when general crew members undertake the crew task i.

In an embodiment, the first sub-model and the second sub-model are solved using the Lagrangian relaxation algorithm through steps of:

(i) relaxing the crew task coverage constraint in the first sub-model, the crew task coverage constraint in the second sub-model and the crew member preference constraint to form a Lagrangian relaxation problem;

(ii) initializing the number of iterations q to 1; initializing Lagrangian multipliers $\lambda_i^C$, $\lambda_i^G$ and $\gamma_i^k$ to 0; and setting an initial iteration step size $\alpha^q$ as k/(q+1), setting the values for the maximum number of iterations $Q_{max}$ and the minimum upper bound-lower bound interval $\in_{min}$;

(iii) solving the Lagrangian relaxation problem using a shortest path solution method to obtain a lower bound of the first sub-model and a lower bound of the second sub-model; adding the feasible crew pairing to a column pool;

(iv) based on continuous update of the column pool, solving the original problem to obtain an upper bound;

(v) calculating an interval between the upper bound and the lower bound of the original problem and determining whether the Lagrangian relaxation algorithm ending condition is met;

if yes, ending the Lagrangian relaxation algorithm; otherwise, proceeding to step (vi); and (vi) updating the Lagrangian multipliers using a subgradient method; and returning to step (iii).

In a second aspect, the present disclosure provides a device of crew replanning for high-speed railway typical scenarios, comprising:

a first module for building a high-speed railway crew connection network;

a second module for establishing a model for high-speed railway crew replanning;

a third module for decomposing the model into a first sub-model for team leaders and a second sub-model for general crew members; and a fourth module for designing a Lagrangian relaxation algorithm to solve two sub-models.

In a third aspect, the present disclosure provides an electronic device, comprising:

a processor;

a memory; and a computer program;

wherein the computer program is stored on the memory and is configured to be executed by the processor to implement the method for optimizing crew replanning for high-speed railway typical scenarios.

In a fourth aspect, the present disclosure also provides a computer-readable storage medium, wherein the computer-readable storage medium stores a computer program; and the computer program is configured to be executed by a processor to implement the method for optimizing crew replanning for high-speed railway typical scenarios.

Compared to the prior art, the present disclosure has the following beneficial effects.

(1) Compared with the traditional manual crew replanning, the present disclosure constructs an optimization model and solves the problem to greatly improve an efficiency of crew replanning;

(2) the deviation of the crew replanning, the number of times adding the crew member as a passenger, the matching preference of the crew member and deviated monthly working hours of the crew member are comprehensively considered to construct the model, which causes the crew replanning more scientific and reasonable;

and (3) the Lagrangian relaxation algorithm designed by the present disclosure can be used to solve the model of crew replanning, which has an excellent versatility, good solution quality and high solution efficiency.

BRIEF DESCRIPTION OF THE DRAWINGS

In order to explain the technical solutions of the embodiments of the present disclosure more clearly, the drawings that need to be used in the embodiments will be briefly described below.

DETAILED DESCRIPTION OF EMBODIMENTS

Figure 1:
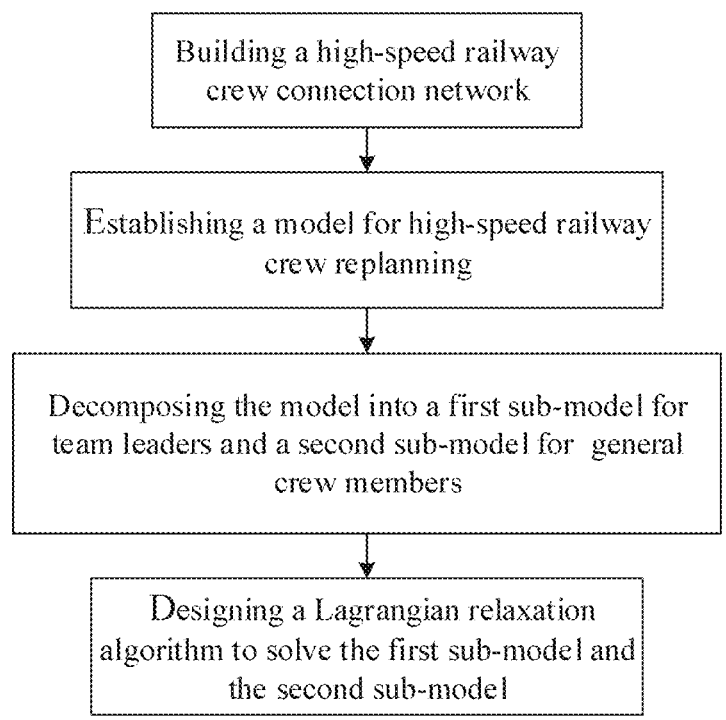
FIG. 1 schematically shows a flow chart of a method of crew replanning for high-speed railway typical scenarios according to an embodiment of the present disclosure.

The disclosure will be described completely and clearly below with reference to the accompanying drawings and embodiments to make the object, technical solutions, and beneficial effects of the present disclosure clearer. Obviously, the embodiments provided in the accompanying drawings are merely illustrative, and are not intended to limit the scope of the present disclosure. It should be understood that any modifications, replacements and improvements made by those skilled in the art without departing from the spirit and scope of the present disclosure should fall within the scope of the present disclosure defined by the appended claims.

Provided herein is a method of crew replanning for high-speed railway typical scenarios, which firstly analyzes several typical application scenarios of crew replanning for high-speed railway; based on this, constructs a high-speed railway crew connection network, and establishes a model, close to reality, for high-speed railway crew replanning; decomposes the model to a first sub-model for team leaders and a second sub-model for general crew members; and designs a Lagrangian relaxation algorithm to solve two sub-models.

A research process of the method includes analysis of the several typical scenarios of crew replanning for high-speed railway, construction of high-speed railway crew connection network, establishment of the model for high-speed railway crew replanning, decomposition of the model for high-speed railway crew replanning and design of the Lagrangian relaxation algorithm.

Actually, the method of the present disclosure is optimized and replanning based on the following scenarios, which are described as follows.

In a process of railway operation, when changing timetable, adding temporary passenger trains, coupling or uncoupling train, and enabling hot-backup occur, the crew scheduling plan for high-speed railway needs to be replanned, which are described as follows.

(1) In the process of railway operation, when there is a peak passenger flow, the railway operation department usually increases the capacity by coupling the trains.

During the process, the number of the crew members needs to be increased to meet an increased crew task. Normally, when a train consists of 8 composition, 1 leader and 2 general crew members are required; and when the train is coupling to 8+8 composition, 2 leaders and 4 general crew members are required. At this time, the crew assignment has changed, and a selected crew member needs to be re-assigned to complete the increased crew task. In addition, since the selected crew member is assigned to undertake the increased crew task, an original crew task undertaken by the selected crew member may not be available to continue to complete the original crew task, therefore, an entire crew scheduling needs to be replanned.

(2) With the increase in the types of China railway high-speed (CRH) train, the 16 composition trains have been put into use. In the process of railway operation, the 16 composition and 8+8 composition trains are often used instead. However, the 16 composition trains need to be equipped with 1 leader and 4 general crew members, while the 8+8 composition trains need to be equipped with 2 leader and 4 general crew members, which are quite different from each other. Therefore, when the 16 composition and 8+8 composition trains are replaced with each other according to operational requirement, the crew scheduling needs to be replanned.

In view of the above scenarios of crew replanning, the present disclosure provides the optimization method of crew replanning for high-speed railway.

FIG. 1 schematically shows a flow chart of the method of crew replanning for high-speed railway typical scenarios. The method is performed as follows.

1. A high-speed railway crew connection network is built.

(1) Connection network parameters are defined.

R represents a set of all crew members; r is any one of all crew members.

The crew members are divided into a leader and a general crew member, and the general crew member is divided in to a cabin crew member and a safety personnel.

D is a set of all schedule days in a scheduling cycle, $D=\{d|d=1, 2, 3, \ldots, N_D\}$, where d is any one of the schedule days, and $N_D$ is the total number of days in the scheduling cycle.

E represents a set of all crew duties in the scheduling cycle; e is any one of all crew duties; $s_e^{start}$ is a start position of the crew duty e; $s_e^{end}$ is an end position of the crew duty e; $t_e^{start}$ time of the crew duty e; $t_e^{end}$ end time of the crew duty e; $t_e$ is a duration of the crew duty e; $d_e$ represents a schedule day serial number of the crew duty e; and $k_e$ represents the crew preference of the crew duty e.

$E_T$ represents a set of all replanning crew duties in the scheduling cycle; $e_T$ is any one of all replanning crew duties; $s_{e_T}^{start}$ is a start position of the replanning crew duty $e_T$; $s_{e_T}^{end}$ is an end position of the replanning crew duty $e_T$; $t_{e_T}^{start}$ represents a start time of the replanning crew duty $e_T$; $t_{e_T}^{end}$ represents an end time of the replanning crew duty $e_T$; $t_{e_T}$ represents a duration of the replanning crew duty $e_T$; $d_{e_T}$ represents a schedule day serial number of the replanning crew duty $e_T$; and $k_{e_T}$ represents the crew preference of the replanning crew duty $e_T$.

$m_n$ represents crew base, in which n is a positive integer.

(2) The high-speed railway crew connection network is built through steps of performing node establishment and establishing connection arcs.

The node establishment includes the following steps.

A day before a start of a scheduling cycle is denoted as d=0.

The moment 0:00 of d=0 is denoted as time zero, in minutes; where for $\forall e \in E$, a start time $t_{de}^{start}$ is expressed as $t_{de}^{start}=t_e^{start}+1440 \times d_e$, and an end time $t_{de}^{end}$ is expressed as $t_{de}^{end}=t_e^{end}+1440 \times d_e$, for $\forall e_T \in E_T$, a start time $t_{de_T}^{start}$ is expressed as $t_{de_T}^{start}=t_{e_T}^{start}+1440 \times d_{e_T}$, and end time $T_{de_T}^{end}$ is expressed as $t_{de_T}^{end}=t_{e_T}^{end}+1440 \times d_{e_T}$. Nodes are established respectively corresponding to an initial state of each crew member, crew duties of each day within the scheduling cycle and replanning crew duties according to schedule day. The initial state (initial position) of each crew member is obtained by using a positioning device (e.g., GPS).

The node establishment further includes the following steps.

Virtual crew base source nodes $m_1^O, m_2^O, \ldots, m_n^O$ for all crew bases in a crew area involved in crew scheduling are established respectively, and a set of the virtual crew base source nodes is denoted as $V_O$. There is a unique crew base for $\forall r \in R$.

Virtual crew base end nodes $m_1^D, m_2^D, \ldots m_n^D$ for all crew bases in the crew area involved in the crew scheduling are established respectively, and a set of the virtual crew base end nodes is denoted as $V_D$.

For $\forall e \in R$, $d_e \in \{d | d=1 \ldots N_D-1\}$ and $\forall e_T \forall E_T$, $d_{e_T} \in \{d | d=1 \ldots N_D-1\}$, an intermediate node $v_e^d$ corresponding to the crew duty and an intermediate node $v_{e_T}^d$ of the replanning crew duty are established. Where the intermediate node $v_e^d$ and the intermediate node $v_{e_T}^d$ each has seven attributes, respectively start position, start time, end position, end time, duration, schedule day serial number and crew preference.

A set of intermediate nodes of all crew duties in the scheduling cycle is denoted as $V_{mid}^E$.

A set of intermediate nodes of all replanning crew duties is denoted as $V_{mid}^T$.

A set of all intermediate nodes is denoted as $V_{mid}$.

A set of all nodes is denoted as V.

The connection arc is established as follows.

a) For $\forall r \in R$, if a crew base to which the crew member r belongs is the same as a start position of $\forall e \in E$ and $\forall e_T \in E_T$, and the crew member r conforms to a crew preference of $\forall e \in E$ and $\forall e_T \in E_T$, for crew member, a crew On-duty arc $(m_n^o, v_e^d)$ is established between a virtual crew base source node $m_n^o$ and the intermediate node $v_e^d$, or a crew On-duty arc $(m_n^o, v_{e_T}^d)$ is established between the virtual crew base source node $m_n^o$ and the intermediate node $v_{e_T}^d$. A set of all crew On-duty arcs is denoted as $A_{On-duty}$.

b) From the schedule day d=0 to schedule day $d=N_D-1$, for any one-day crew duty and replanning crew duty, if an end position of a previous crew duty is the same as a start position of a next crew duty, a crew connection arc $(v_{e_1}^d, v_{e_2}^d)$ is established between an intermediate node $v_{e_1}^d$ and an intermediate node $v_{e_2}^d$, a crew connection arc $(v_{e_T}^d, v_e^d)$ is established between the intermediate node $v_{e_T}^d$ and the intermediate node $v_e^d$, or a crew connection arc $(v_e^d, v_{e_T}^d)$ is established between the intermediate node $v_e^d$ and the intermediate node $v_{e_T}^d$. A set of all crew connection arcs is denoted as $A_{connection}$.

c) From the schedule day d=0 to the schedule day $d=N_D-1$, for $\forall r \in R$, when the end position of an intermediate node, which crew r completed, is different from a start position of the next intermediate node to be completed but the same as a start position of the another intermediate node, a deadheading arc $(v_{e_1}^d, v_{e_2}^d)$ is established between the intermediate node $v_{e_1}^d$ and the intermediate node $v_{e_2}^d$, a deadheading arc $(v_{e_T}^d, v_e^d)$ is established between the intermediate node $v_{e_T}^d$ and the intermediate node $v_e^d$, or a deadheading arc $(v_e^d, v_{e_T}^d)$ is established between the intermediate node $v_e^d$ and the intermediate node $v_{e_T}^d$. A set of all deadheading arcs is denoted as $A_{deadheading}$.

d) For $\forall r \in R$ if the crew base to which the crew member r belongs is the same as an end position of $\forall e \in E$ and $\forall e_T \in E_T$, and the crew member r conforms to the crew preference of $\forall e \in E$ and $\forall e_T \in E_T$, a crew Off-duty arc $(v_e^d, m_n^D)$ is established between the virtual crew base end node $m_n^D$ and the intermediate node $v_e^d$, or a crew Off-duty arc $(v_{e_T}^d, M_n^D)$ is established between the virtual crew base end node $m_n^D$ and the intermediate node $v_{e_T}^d$. A set of all crew Off-duty arcs as $A_{off-duty}$.

e) A set of all arcs is denoted as A.

The high-speed railway crew connection network is expressed as N(V,A).

Figure 2:
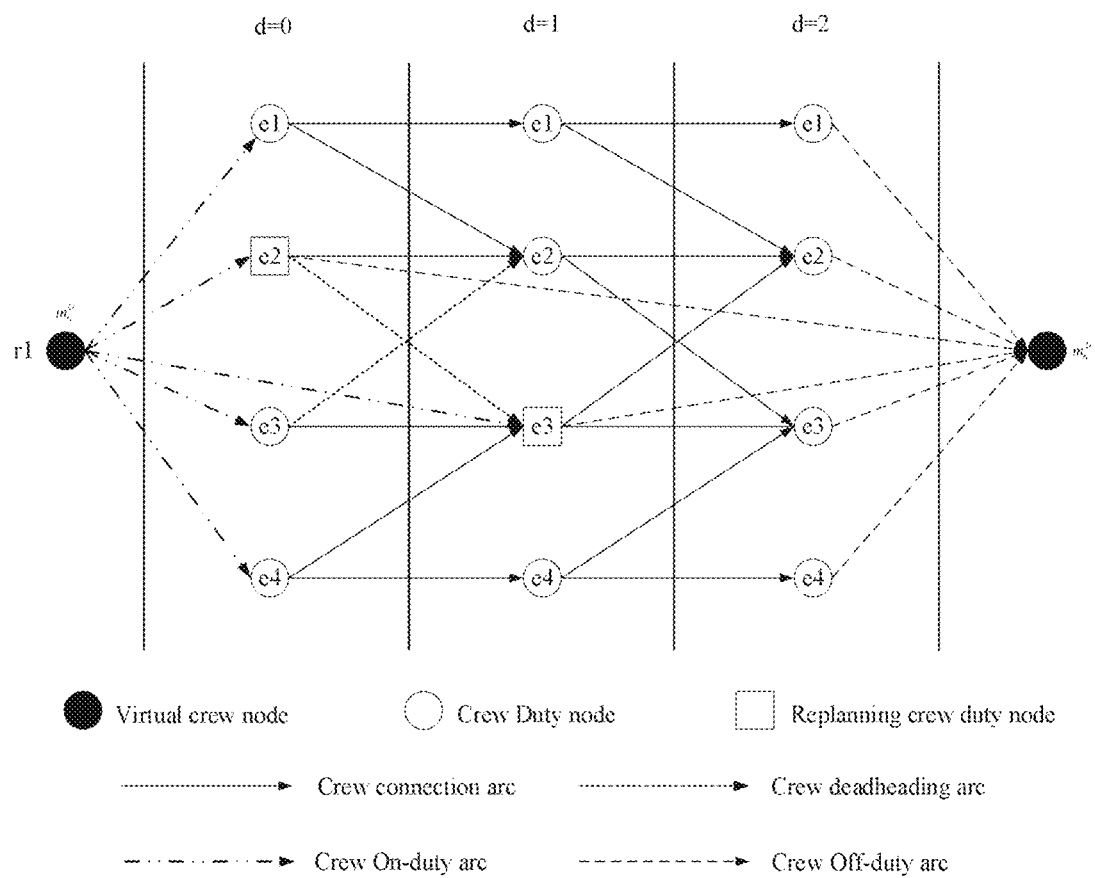
FIG. 2 is a schematic diagram of crew connection network according to an embodiment of the present disclosure.

As shown in FIG. 2, a schematic diagram of a crew connection network with the scheduling cycle of 2 days is built.

2. A model for high-speed railway crew replanning is established.

(1) The following parameters and variables are defined.

N represents a set of all crew tasks; and i is any one of all crew tasks.

For all crew tasks, which can be divided into a crew task of a leader and a crew task of a general crew member. The crew task of the general crew member can be divided into a crew task of a cabin crew member and a crew task of safety personnel. When taking on the crew duty, the leader can undertake the duty of the crew task of the general crew member, and the leader and the general crew member can undertake the duty of the crew task of the safety personnel.

$N^L$ represents a set of crew tasks of the leader; $N^G$ is a set of crew tasks of the general crew member; $N^C$ is a set of the crew tasks of the cabin personnel; and $N^S$ represents a set of crew tasks of the safety personnel.

$R^L$ represents a set of leaders; $R^G$ is a set of general crew members; $R^C$ represents a set of cabin crew members; and $R^S$ represents a set of the safety personnel.

$\pi(r)$ represents the leader in a crew team corresponding to any general crew member $r \in R^G$, and $\pi(r) \in R^L$.

$\sigma(i)$ represents the leader crew task corresponding to any general crew task $i \in N^G$, $\sigma(i) \in N^L$.

$h_i^r$ represents a penalty cost when the crew member r does not undertake the crew task i with a corresponding leader.

$P_r$ represents a set of feasible crew pairings for the crew member r; and p is any one of the crew pairings.

$\alpha_{pi}^r$ is a 0-1 variable; where if the crew pairing $p \in P_r$ includes the crew task $i \in N$, $a_{pi}^r$ is equal to 1; otherwise, $\alpha_{pi}^r$, is equal to 0.

$c_p^r$ represents cost required for the crew pairing $p \in p_r$.

$g_i^L$ represents the number of leaders required to undertake the crew task $i \in N$; $g_i^C$ represents the number of crew members required to undertake the crew task $i \in N$; and $g_i^S$ represents the number of safety personnel required to undertake the crew task $i \in N$.

$f_i$ represents a penalty cost when the crew task i is assigned to one less crew member, and one less crew member is allowed.

K represents a set of preferences of the crew task to crew member assignment; k is any one of the set of preferences.

$e_{pi}^{rk}$ represents a known 0-1 variable, which indicates that the crew task $i \in N^G$ in the crew pairing p has a preference $k \in K$ for the crew member r; if the preference points to males, when the crew member r is male, $e_{pi}^{rk}$ is equal to 1; otherwise, $e_{pi}^{rk}$ is equal to 0.

$d_i^k$ represents a threshold of the preference k of the crew task i; if the preference k points to males, the threshold is equal to the number of male crew members required by the crew task i.

$x_p^r$ is a 0-1 decision variable; if the crew member $r \in R$ undertakes the crew pairing $p \in p_r$, $x_p^r$ is equal to 1; otherwise, $x_p^r$ is equal to 0.

$y_i$ is a 0-1 decision variable, where if one less crew member is assigned to perform the crew task $i \in N^C$, $y_i$ is equal to 1; otherwise, $y_i$ is equal to 0.

$z_i^r$ is a 0-1 decision variable; where if the crew member $r \in R^G$ does not undertake the crew task $i \in N^G$ with the corresponding leader, $z_i^r$ is equal to 1; otherwise, $z_i^r$ is equal to 0.

(2) An objective function for the model is established.

An optimization objective of the model is to minimize cost of replanned crew scheduling, and the objective function is expressed as:

$$\min \sum_{r \in R} \sum_{p \in P_r} c_p^r x_p^r + \sum_{i \in N^C} f_i y_i + \sum_{r \in R^G} \sum_{i \in N^G} h_i^r z_i^r.$$

The cost $c_p^r$ is calculated as follows:

$$c_p^r = \alpha_r + \sum_{i \in N_p} \beta_i b_{pi}^r + \sum_{i \in N_p} \mu_i d_{pi}^r + \eta_r \delta_p^r.$$

Where $\alpha_r$ represents a penalty value for the crew member r when deviating from an original crew pairing; $\beta_i$ represents a cost when the crew members deadhead as passengers to the crew task; $b_{pi}^r$ is a 0-1 variable; where if the crew member r is added as a passenger to the crew task i in the crew pairing p, $b_{pi}^r$ is equal to 1; otherwise, by is equal to 0; $\mu_i$ represents a cost of matching preference of the crew task i; $\eta_r$ represents a penalty coefficient of deviated monthly working hours of the crew member r; and $\delta_p^r$ represents deviated monthly working hours of the crew member r when undertaking the crew pairing p.

(3) Constraints for the model are established.

a) For $\forall r \in R$, the crew member r is allowed to choose only one crew pairing during the scheduling cycle, expressed as follows:

$$\sum_{p \in P_r} x_p^r = 1, \forall r \in R.$$

b) For all crew tasks of the leader, all crew tasks of cabin crew members and all crew tasks of safety personnel, there is a matching crew member, expressed as follows:

$$\sum_{r \in R^L} \sum_{p \in P_r} a_{pi}^r x_p^r = g_i^L, \forall i \in N^L;$$

$$\sum_{r \in R^C} \sum_{p \in P_r} a_{pi}^r x_p^r + y_i = g_i^C, \forall i \in N^C;$$

and $$\sum_{r \in R^S} \sum_{p \in P_r} a_{pi}^r x_p^r = g_i^S, \forall i \in N^S.$$

c) When arranging a task with crew preference, it is needed to meet the crew preference, expressed as follows:

$$\sum_{r \in R^G} \sum_{p \in P_r} e_{pi}^{rk} x_p^r \geq d_i^k, \forall k \in K, i \in N^G.$$

d) A leader-crew matching constraint, expressed as follows:

$$\sum_{p \in P_r} a_{pi}^r x_p^r - \sum_{p \in P_{\pi(r)}} a_{p\sigma(i)}^{\pi(r)} x_p^{\pi(r)} \leq z_i^r, \forall r \in R^G, i \in N^G.$$

When the crew member $r \in R^G$ does not undertake the crew task $i \in N^G$ together with the corresponding leader $\pi(r)$, $z_i^r = 1$.

e) A decision variable constraint, expressed as follows.

$x_p^r \in \{0,1\}, \forall r \in R, p \in P_r;$ $y_i \in \{0,1\}, \forall i \in N^C;$ and $z_i^r \in \{0,1\}, \forall r \in R^G, i \in N^G.$ 3. The model is decomposed into a first sub-model for replanning scheduling of a leader and a second sub-model for replanning scheduling of a general crew member.

The first sub-model is configured to complete the crew task of the leader, and an optimization objective of the first sub-model is to minimize a cost of completing the leader crew tasks, expressed as $$\min \sum_{r \in R^L} \sum_{p \in P_r} c_p^r x_p^r.$$

Constraints of the first sub-model include the following conditions.

a) Any one of leaders is allowed to choose only one crew pairing during the scheduling cycle, expressed as follows:

$$\sum_{p \in P_r} x_p^r = 1, \forall r \in R^L.$$

b) A crew task coverage constraint, where for any of the leader crew tasks, there is a matching leader to undertake, expressed as follows:

$$\sum_{r \in R^L} \sum_{p \in P_r} a_{pi}^r x_p^r = g_i^L, \forall i \in N^L.$$

c) A decision variable constraint, expressed as follows:

$x_p^r \in \{0,1\}, \forall r \in R^L, p \in P_r$

The second sub-model is configured to complete the crew tasks of general crew members, and an optimization objective of the second sub-model is to minimize a cost of completing the crew tasks of general crew members, expressed as $$\min \sum_{r \in R^G} \sum_{p \in P_r} \hat{c}_p^r x_p^r + \sum_{i \in N^C} f_i y_i.$$

In which, since the scheduling of the leader is determined after the first sub-model is solved, a value of $z_i^r$ is determined according to the crew scheduling plan of the general crew members, so as to obtain a cost $\hat{c}_p^r$ of a general crew member r to undertake the crew pairing p expressed as:

$$\hat{c}_p^r = c_p^r + \sum_{i \in N_p} h_i^r z_i^r.$$

Constraints of the second sub-model include the following conditions.

a) For any general crew member r is allowed to choose only one crew pairing during the scheduling cycle, expressed as follows:

$$\sum_{p \in P_r} x_p^r = 1, \forall r \in R^G.$$

b) A crew task coverage constraint, where for any of the crew tasks of general crew members, there is a matching general crew member to undertake, expressed as follows:

$$\sum_{r \in R^C} \sum_{p \in P_r} a^r_{pi} x^r_p + y_i = g^C_i, \forall i \in N^C;$$

and $$\sum_{r \in R^S} \sum_{p \in P_r} a^r_{pi} x^r_p = g^S_i, \forall i \in N^S.$$

c) a crew member preference constraint, when arranging a crew task with a crew member preference, it is needed to meet the crew member preference, expressed as follows:

$$\sum_{r \in R^G} \sum_{p \in P_r} e^{rk}_{pi} x^r_p \geq d^k_i, \forall k \in K, i \in N^G.$$

d) A decision variable constraint, expressed as follows:

$x^r_p \in \{0,1\}, \forall r \in R^G, p \in P_r$; and $y_i \in \forall \{0,1\}, \forall i \in N^C$.

4. A Lagrangian relaxation algorithm is designed to solve the first sub-model and the second sub-model.

From analysis of the first sub-model and the second sub-model, it can be found that crew task coverage constraints and the preference constraint are complex constraints that cause the problem to become larger and restrict the solution of the model. Therefore, the crew task coverage constraint in the first sub-model is relaxed and added into the objective function as a penalty item, and the crew task coverage constraint in the second sub-model and the crew member preference constraint are relaxed and added into the objective function as penalty items.

(1) The first sub-model with the crew task coverage constraint relaxed is expressed as:

$$\Theta^L(\lambda) = \sum_{r \in R^L} \sum_{p \in P^r} \left( c^r_p - \sum_{i \in N^L} \lambda^L_i a^r_{pi} \right) x^r_p + \sum_{i \in N^L} \lambda^L_i g^L_i;$$

s.t. $\sum_{p \in P_r} x^r_p = 1, \forall r \in R^L;$ and $x^r_p \in \{0,1\}, \forall r \in R^L, p \in P_r.$ Where $\lambda^L_i$ is a Lagrange multiplier, indicating a cost generated when the leader L undertakes the crew task i (2) The second sub-model with the crew task coverage constraint and the crew member preference constraint relaxed is expressed as:

$$\Theta^G(\lambda, \gamma) = \sum_{r \in R^G} \sum_{p \in P^r} \left( \hat{c}^r_p - \sum_{i \in N^G} \lambda^G_i a^r_{pi} - \sum_{k \in K} \sum_{i \in N^G} \gamma^k_i e^{rk}_{pi} \right) x^r_p +$$

$$\sum_{i \in N^C} (f_i - \lambda^C_i) y_i + \sum_{i \in N^G} \lambda^G_i g^G_i + \sum_{k \in K} \sum_{i \in N^G} \gamma^k_i d^k_i;$$

s.t. $\sum_{p \in P_r} x^r_p = 1, \forall r \in R^G; x^r_p \in \{0,1\}, \forall r \in R^G, p \in P_r;$ and $y_i \in \{0,1\}, \forall i \in N^C.$ Where $\lambda^C_i$, $\lambda^G_i$ and $\gamma^k_i$ are respectively a Lagrange multiplier, indicating the cost generated when general crew members undertake the crew task i.

Figure 3:
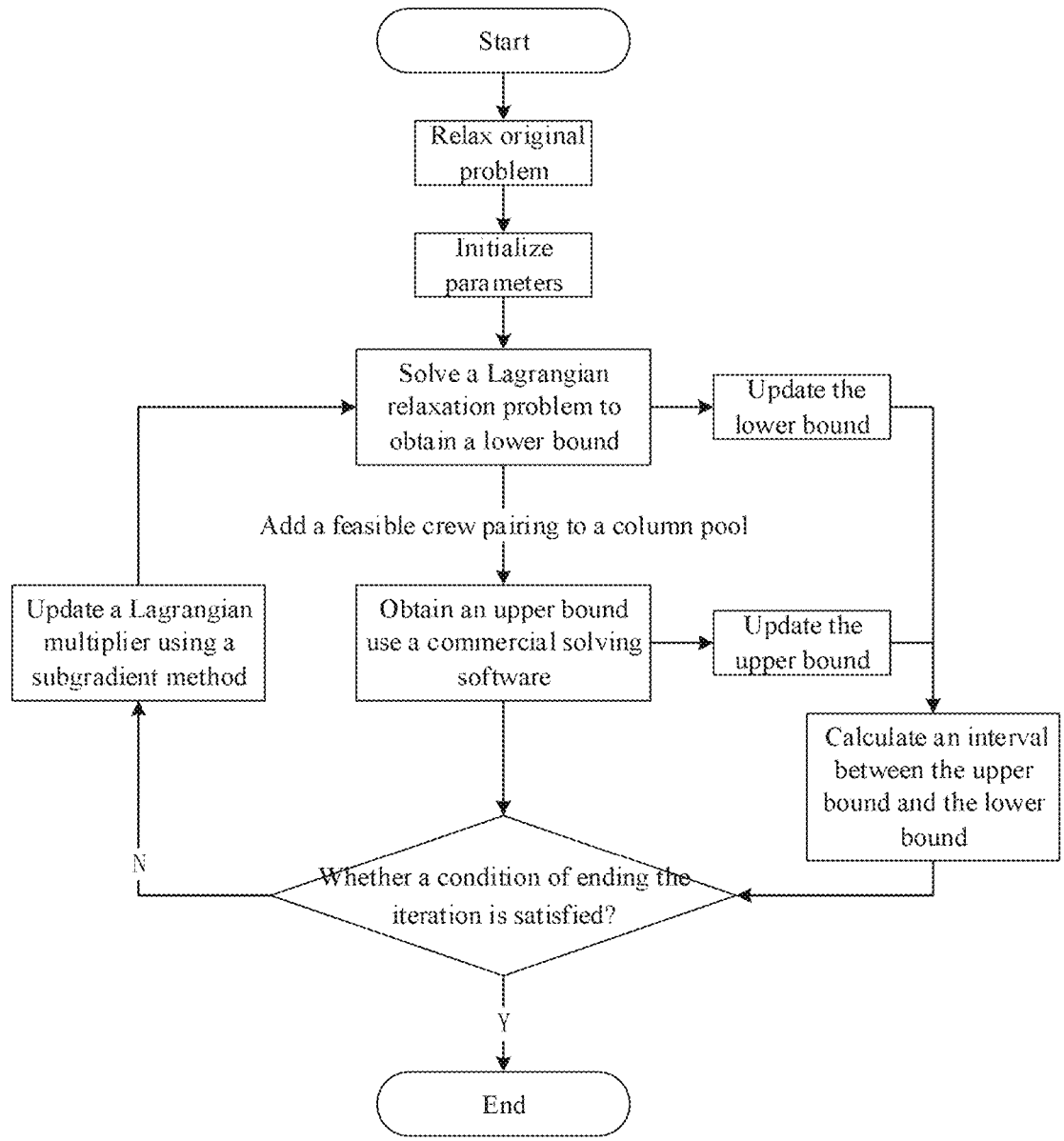
FIG. 3 is a solution flow chart of Lagrangian relaxation algorithm according to an embodiment of the present disclosure.

After the the first sub-model and the second sub-model are relaxed, the model becomes a classic shortest path problem. The solution method of the shortest path problem can be used to find a lower bound of the two problems, and a feasible crew pairing is added to a column pool, and then a commercial solving software is configured to solve the original problem to obtain an upper bound, then an interval between the upper bound and the lower bound is calculated, and whether a condition of ending the Lagrangian relaxation algorithm is met is determined. If yes, the Lagrangian relaxation algorithm is ended; otherwise, the Lagrangian multipliers are updated, and the lower bound and the upper bound are found continuously to meet the condition until the Lagrangian relaxation algorithm is ended. An overall solution flow of the problem is shown in FIG. 3.

(i) The crew task coverage constraint in the first sub-model, the crew task coverage constraint in the second sub-model and the crew member preference constraint are relaxed to form a Lagrangian relaxation problem.

(ii) The number of iterations q is initialized to 1.

The Lagrangian multipliers $\lambda^C_i$, $\lambda^G_i$ and $\gamma^k_i$ are initialized to 0.

An initial iteration step size $\alpha^q$ is set as k/(q+1), the maximum number of iterations $Q_{max}$ and the minimum upper bound-lower bound interval $\epsilon_{min}$ are set.

(iii) The Lagrangian relaxation problem is solved using a shortest path solution method to obtain a lower bound of the first sub-model, and a lower bound of the second sub-model. The feasible crew pairing is added a the column pool.

(iv) Based on continuous update of the column pool, the original problem is solved with commercial solving software to obtain an upper bound.

(v) An interval between the upper bound and the lower bound of the original problem, and whether the condition of ending the Lagrangian relaxation algorithm is met is determined. If yes, the Lagrangian relaxation algorithm is ended; otherwise, step (vi) is performed.

(vi) The Lagrangian multipliers are updated using a subgradient method; and step (iii)-(v) are repeated.

Figure 4:
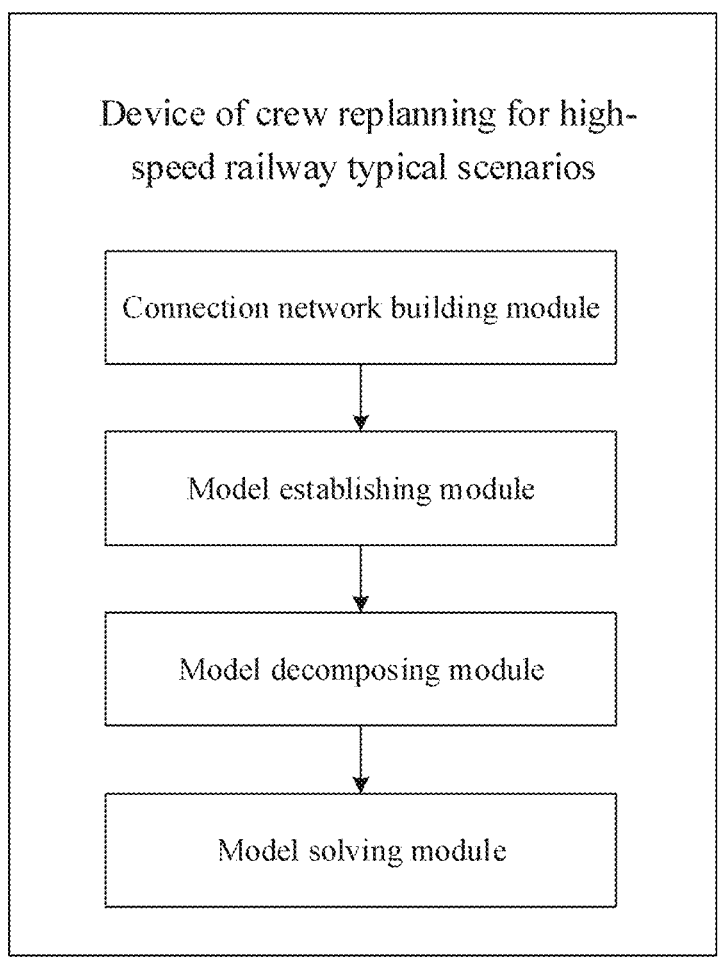
FIG. 4 schematically shows a structural block diagram of a device of crew replanning for high-speed railway typical scenarios according to an embodiment of the present disclosure.

In order to realize the objection mentioned above, the present disclosure provides a device (as shown in FIG. 4) of crew replanning for high-speed railway typical scenarios, which includes a first module for building a high-speed railway crew connection network, a second module for establishing a model for high-speed railway crew replanning, a third module for decomposing the model into a first sub-model for team leaders and a second sub-model for general crew members, and a fourth module for designing a Lagrangian relaxation algorithm to solve two sub-models. The third module and the fourth module improve the computing efficiency, effectively reduce central processing unit (CPU) usage time, and save a storage space.

Specifically, the first module is configured for building a high-speed railway crew connection network, which includes the following steps.

(1) Connection network parameters are defined.

R represents a set of all crew members; and r is any one of all crew members.

The crew members are divided into a leader and a general crew member, and the general crew member is divided into cabin crew member and safety personnel.

D is a set of all schedule days in the scheduling cycle, $D=\{d|d=1, 2, 3, \ldots, N_D\}$, where d is any one of the schedule days, and $N_D$ is the total number of days in the scheduling cycle.

E represents a set of all crew duties in the scheduling cycle; e is any one of all crew duties; $s_e^{start}$ is a start position of the crew duty e; $s_e^{end}$ is an end position of the crew duty e; $t_e^{start}$ is a start time of the crew duty e; $t_e^{end}$ is an end time of the crew duty e; $t_e$ is a duration of the crew duty e; $d_e$ represents a schedule day serial number of the crew duty e; and $k_e$ represents the crew preference of the crew duty e.

$E_T$ represents a set of all replanning crew duties in the scheduling cycle; $e_T$ is any one of all replanning crew duties; $s_{e_T}^{start}$ is a start position of the replanning crew duty $e_T$; $s_{e_T}^{end}$ is an end position of the replanning crew duty $e_T$; $t_{e_T}^{start}$ represents a start time of the replanning crew duty $e_T$; $t_{e_T}^{end}$ represents an end time of the replanning crew duty $e_T$; $t_{e_T}$ represents a duration of the replanning crew duty $e_T$; $d_e$ represents a schedule day serial number of the replanning crew duty $e_T$; and $k_{e_T}$ represents the crew preference of the replanning crew duty $e_T$.

$m_n$ represents a crew base, in which n is a positive integer.

(2) The high-speed railway crew connection network includes establishing a node and establishing connection arcs.

The node establishment includes the following steps.

A day before a start of a scheduling cycle is denoted as $d=0$.

The moment 0:00 of $d=0$ is denoted as time zero, in minutes, where for $\forall e \in E$, a start time $t_{de}^{start}$ is expressed as $t_{de}^{start}=t_e^{start}+1440\times d_e$, and an end time $t_{de}^{end}$ expressed as $t_{de}^{end}=t_e^{end}+1440\times d_e$; for $\forall e_T \in E_T$, a start time $t_{de_T}^{start}$ is expressed as $t_{de_T}^{start}+1440\times d_{e_T}$, and an end time $t_{de_T}^{end}$ is expressed as $t_{de_T}^{end}=t_{e_T}^{end}+1440\times d_{e_T}$. Nodes are established respectively corresponding to an initial state of each crew member, crew duties of each day within the scheduling cycle and replanning crew duties according to schedule day.

The node establishment further includes the following steps.

Virtual crew base source nodes $m_1^O, m_2^O, \ldots m_n^O$ for all crew bases in a crew area involved in crew scheduling are established respectively, and a set of the virtual crew base source nodes is denoted as $V_O$. There is a unique crew base for $\forall r \in R$.

Virtual crew base end nodes $m_1^D, m_2^D, \ldots m_n^D$ for all crew bases in the crew area involved in the crew scheduling are established respectively, and a set of the virtual crew base end nodes is denoted as $V_D$.

For $\forall e \in E$, $d_e \in \{d|d=1 \ldots N_D-1\}$ and $\forall e_T \in E_T$, $d_{e_T} \in \{d|d=1 \ldots N_D-1\}$, an intermediate node $v_e^d$ corresponding to the crew duty and an intermediate node $v_{e_T}^d$ of the replanning crew duty are established. Where the intermediate node $v_e^d$ and the intermediate node $v_{e_T}^d$ each has seven attributes, respectively start position, start time, end position, end time, duration, schedule day serial number and crew preference.

A set of intermediate nodes of all crew duties in the scheduling cycle is denoted as $V_{mid}^E$.

A set of intermediate nodes of all replanning crew duties is denoted as $V_{mid}^T$.

A set of all intermediate nodes is denoted as $V_{mid}$.

A set of all nodes is denoted as V.

The connection arc is established as follows.

a) For $\forall r \in R$ if a crew base to which the crew member r belongs is the same as a start position of $\forall e \in E$ and $\forall e_T \in E_T$, and the crew member r conforms to a crew preference of $\forall e \in E$ and $\forall e_T \in E_T$, for crew member, a crew On-duty arc $(m_n^O, v_e^d)$ is established between a virtual crew base source node $m_n^O$ and the intermediate node $v_e^d$, or a crew On-duty arc $(m_n^O, v_{e_T}^d)$ is established between the virtual crew base source node $m_n^O$ and the intermediate node $v_{e_T}^d$. A set of all crew On-duty arcs is denoted as $A_{On-duty}$.

b) From the schedule day $d=0$ to schedule day $d=N_D-1$, for any one-day crew duty and replanning crew duty, if an end position of a previous crew duty is the same as a start position of a next crew duty, a crew connection arc $(v_{e_1}^d, v_{e_2}^d)$ is established between an intermediate node $v_{e_1}^d$ and an intermediate node $v_{e_2}^d$, a crew connection arc $(v_{e_2}^d, v_{e_T}^d)$ is established between the intermediate node $V_{e_T}^d$ and the intermediate node $v_e^d$, or a crew connection arc $(v_e^d, v_{e_T}^d)$ is established between the intermediate node $v_e^d$ and the intermediate node $v_{e_T}^d$. A set of all crew connection arcs is denoted as $A_{connection}$.

c) From the schedule day $d=0$ to the schedule day $d=N_D-1$, for $\forall r \in R$, when the end position of an intermediate node, of a completed routing section is different from a start position of an intermediate node of a next routing section to be completed but the same as a start position of an intermediate node of another crew duty, a deadheading arc $(v_{e1}^d, v_{e_2}^d)$ is established between the intermediate node $v_{e_1}^d$ and the intermediate node $v_{e_2}^d$ a deadheading arc $(v_{e_T}^d, v_e^d)$ is established between the intermediate node $v_{e_T}^d$ and the intermediate node $v_e^d$, or a deadheading arc $(v_e^d, v_{e_T}^d)$ is established between the intermediate node $V_e^d$ and the intermediate node $v_{e_T}^d$. A set of all deadheading arcs is denoted as $A_{deadheading}$.

d) For $\forall r \in R$ if the crew base to which the crew member r belongs is the same as an end position of $\forall e \in E$ and $\forall e_T \in E_T$, and the crew member r conforms to the crew preference of $\forall e \in E$ and $\forall e_T \in E_T$, a crew Off-duty arc $(v_e^d, m_n^D)$ is established between the virtual crew base end node $m_n^D$ and the intermediate node $v_e^d$, or a crew Off-duty arc $(v_{e_T}^d, m_n^D)$ is established between the virtual crew base end node $m_n^D$ and the intermediate node $v_{e_T}^d$. A set of all crew Off-duty arcs as $A_{Off-duty}$.

e) A set of all arcs is denoted as A.

The high-speed railway crew connection network is expressed as N (V,A).

As shown in FIG. 2, a schematic diagram of a crew connection network with the scheduling cycle of 2 days is built.

2. A model for high-speed railway crew replanning is established.

(1) The following parameters and variables are defined.

N represents a set of all crew tasks; and i is any one of all crew tasks.

For all crew tasks, which can be divided into a crew task of a leader and a crew task of a general crew member. The crew task of the general crew member can be divided into a crew task of a cabin crew member and a crew task of safety personnel. When taking on the crew duty, the leader can undertake the duty of the crew task of the general crew member, and the leader and the general crew member can undertake the duty of the crew task of the safety personnel.

$N^L$ represents a set of crew tasks of the leader; $N^G$ is a set of crew tasks of the general crew member; $N^C$ is a set of the crew tasks of the cabin personnel; and $N^S$ represents a set of crew tasks of the safety personnel.

$R^L$ represents a set of leaders; $R^G$ is a set of general crew members; $R^C$ represents a set of cabin crew members; and $R^S$ represents a set of the safety personnel.

$\pi(r)$ represents the leader in a crew team corresponding to any general crew member $r \in R^G$, and $\pi(r) \in R^L$.

$\sigma(i)$ represents the leader crew task corresponding to any general crew task $i \in N^G$, $\sigma(i) \in N^L$.

$h_i^r$ represents a penalty cost when the crew member r does not undertake the crew task i with a corresponding leader.

$P_r$ represents a set of feasible crew pairings for the crew member r; and p is any one of the crew pairings.

$\alpha_{pi}^r$ is a 0-1 variable; where if the crew pairing $p \in P_r$ includes the crew task $i \in N$, $\alpha_{pi}^r$ is equal to 1; otherwise, $\alpha_{pi}^r$, is equal to 0.

$c_p^r$ represents cost required for the crew pairing $p \in p_r$.

$g_i^L$ represents the number of leaders required to undertake the crew task $i \in N$; $g_i^c$ represents the number of crew members required to undertake the crew task $i \in N$; and $g_i^S$ represents the number of safety personnel required to undertake the crew task $i \in N$.

$f_i$ represents a penalty cost when the crew task i is assigned to one less crew member, and one less crew member is allowed.

K represents a set of preferences of the crew task to crew member assignment; k is any one of the set of preferences.

$e_{pi}^{rk}$ represents a known 0-1 variable, which indicates that the crew task $i \in N^G$ in the crew pairing p has a preference $k \in K$ for the crew member r; if the preference points to males, when the crew member r is male, $e_{pi}^{rk}$ is equal to 1; otherwise, $e_{pi}^{rk}$ is equal to 0.

$d_i^k$ represents a threshold of the preference k of the crew task i; if the preference k points to males, the threshold is equal to the number of male crew members required by the crew task i.

$x_p^r$ is a 0-1 decision variable; if the crew member $r \in R$ undertakes the crew pairing $p \in P_r$, $x_p^r$ is equal to 1; otherwise, $x_p^r$ is equal to 0.

$y_i$ is a 0-1 decision variable, where if one less crew member is assigned to perform the crew task $i \in N^C$, $y_i$ is equal to 1; otherwise, $y_i$ is equal to 0.

$z_i^r$ is a 0-1 decision variable; where if the crew member $r \in R^G$ does not undertake the crew task $i \in N^G$ with the corresponding leader, $z_i$ is equal to 1; otherwise, $z_i^r$ is equal to 0.

(2) An objective function for the model is established.

An optimization objective of the model is to minimize cost of replanned crew scheduling plan, and the objective function is expressed as:

$$\min \sum_{r \in R} \sum_{p \in P_r} c_p^r x_p^r + \sum_{i \in N^C} f_i y_i + \sum_{r \in R^G} \sum_{i \in N^G} h_i^r z_i^r.$$

The cost $c_p^r$ is calculated as follows:

$$c_p^r = \alpha_r + \sum_{i \in N_p} \beta_i b_{pi}^r + \sum_{i \in N_p} \mu_i d_{pi}^r + \eta_r \delta_p^r.$$

Where $\alpha_r$ represents a penalty value for the crew member r when deviating from an original crew pairing; $\beta_i$ represents a cost when the crew members deadhead as passengers to the crew task; $b_{pi}^r$ is a 0-1 variable; where if the crew member r is added as a passenger to the crew task i in the crew pairing p, $b_{pi}^r$ is equal to 1; otherwise, $b_{pi}^r$ is equal to 0; $\mu_i$, represents a cost of matching preference of the crew task i;

$\eta_r$ represents a penalty coefficient of deviated monthly working hours of the crew member r; and $\delta_p^r$ represents deviated monthly working hours of the crew member r when undertaking the crew pairing p.

(3) Constraints for the model are established.

a) For $\forall r \in R$, the crew member r is allowed to choose only one crew pairing during the scheduling cycle, expressed as follows:

$$\sum_{p \in P_r} x_p^r = 1, \forall r \in R.$$

b) For all crew tasks of the leader, all crew tasks of cabin crew members and all crew tasks of safety personnel, there is a matching crew member, expressed as follows:

$$\sum_{r \in R^L} \sum_{p \in P_r} a_{pi}^r x_p^r = g_i^L, \forall i \in N^L;$$

$$\sum_{r \in R^C} \sum_{p \in P_r} a_{pi}^r x_p^r + y_i = g_i^C, \forall i \in N^C; \text{ and}$$

$$\sum_{r \in R^S} \sum_{p \in P_r} a_{pi}^r x_p^r = g_i^S, \forall i \in N^S.$$

c) When arranging a task with crew preference, it is needed to meet the crew preference, expressed as follows:

$$\sum_{r \in R^G} \sum_{p \in P_r} e_{pi}^{rk} x_p^r \geq d_i^k, \forall k \in K, i \in N^G.$$

d) A leader-crew matching constraint, expressed as follows:

$$\sum_{p \in P_r} a_{pi}^r x_p^r - \sum_{p \in P_{\pi(r)}} a_{p\sigma(i)}^{\pi(r)} x_p^{\pi(r)} \leq z_i^r, \forall r \in R^G, i \in N^G.$$

When the crew member $r \in R^G$ does not undertake the crew task $i \in N^G$ together with the corresponding leader $\pi(r)$, $z_i^r = 1$.

e) A decision variable constraint, expressed as follows.

$x_p^r \in \{0,1\}, \forall r \in R, p \in P_r;$ $y_i \in \{0,1\}, \forall i \in N^C;$ and $z_i^r \in \{0,1\}, \forall r \in R^G, i \in N^G.$ The model is decomposed into a first sub-model for replanning scheduling of a leader and a second sub-model for replanning scheduling of a general crew member.

The first sub-model is configured to complete the crew task of the leader, and an optimization objective of the first sub-model is to minimize a cost of completing the leader crew tasks in the adjusted crew scheduling plan, expressed as $$\min \sum_{r \in R^L} \sum_{p \in P_r} c_p^r x_p^r.$$

Constraints of the first sub-model include the following conditions.

a) Any one of leaders is allowed to choose only one crew pairing during the scheduling cycle, expressed as follows:

$$\sum_{p \in P_r} x_p^r = 1, \forall r \in R^L.$$

b) A crew task coverage constraint, where for any of the leader crew tasks, there is a matching leader to undertake, expressed as follows:

$$\sum_{r \in R^L} \sum_{p \in P_r} a_{pi}^r x_p^r = g_i^L, \forall i \in N^L.$$

c) A decision variable constraint, expressed as follows:

$x_p^r \in \{0,1\}, \forall r \in R^L, p \in P_r$

The second sub-model is configured to complete the crew tasks of general crew members, and an optimization objective of the second sub-model is to minimize a cost of completing the crew tasks of general crew members, expressed as $$\min \sum_{r \in R^G} \sum_{p \in P_r} \hat{c}_p^r x_p^r + \sum_{i \in N^C} f_i y_i.$$

In which, since the scheduling of the leader is determined after the first sub-model is solved, a value of $z_i^r$ is determined according to the crew scheduling plan of the general crew members, so as to obtain a cost $\hat{c}_p^r$ of a general crew member r to undertake the crew pairing p expressed as:

$$\hat{c}_p^r = c_p^r + \sum_{i \in N_p} h_i^r z_i^r.$$

Constraints of the second sub-model include the following conditions.

a) For any general crew member r is allowed to choose only one crew pairing during the scheduling cycle, expressed as follows:

$$\sum_{p \in P_r} x_p^r = 1, \forall r \in R^G.$$

b) A crew task coverage constraint, where for any of the crew tasks of general crew members, there is a matching general crew member to undertake, expressed as follows:

$$\sum_{r \in R^C} \sum_{p \in P_r} a_{pi}^r x_p^r + y_i = g_i^C, \forall i \in N^C; \text{ and}$$

$$\sum_{r \in R^S} \sum_{p \in P_r} a_{pi}^r x_p^r = g_i^S, \forall i \in N^S.$$

c) a crew member preference constraint, when arranging a crew task with a crew member preference, it is needed to meet the crew member preference, expressed as follows:

$$\sum_{r \in R^G} \sum_{p \in P_r} e_{pi}^{rk} x_p^r \geq d_i^k, \forall k \in K, i \in N^G.$$

d) A decision variable constraint, expressed as follows:

$x_p^r \in \{0,1\}, \forall r \in R^G, p \in P_r;$ and $y_i \in \{0,1\}, \forall i \in N^C.$ A Lagrangian relaxation algorithm is designed to solve the first sub-model and the second sub-model.

From analysis of the first sub-model and the second sub-model, it can be found that the crew task coverage constraints and the preference constraint are complex constraints that cause the problem to become larger and restrict the solution of the model. Therefore, the crew task coverage constraint in the first sub-model is relaxed and added into the objective function as a penalty item, and the crew task coverage constraint in the second sub-model and the crew member preference constraint are relaxed and added into the objective function as penalty items.

(1) The first sub-model with the crew task coverage constraint relaxed is expressed as:

$$\Theta^L(\lambda) = \sum_{r \in R^L} \sum_{p \in P^r} \left( c_p^r - \sum_{i \in N^L} \lambda_i^L a_{pi}^r \right) x_p^r + \sum_{i \in N^L} \lambda_i^L g_i^L;$$

s.t. $\sum_{p \in P_r} x_p^r = 1, \forall r \in R^L;$ and $x_p^r \in \{0, 1\}, \forall r \in R^L, p \in P_r.$ Where $\lambda_i^L$ is a Lagrange multiplier, indicating a cost generated when the leader L undertakes the crew task i.

(2) The second sub-model with the crew task coverage constraint and the crew member preference constraint relaxed is expressed as:

$$\Theta^G(\lambda, \gamma) = \sum_{r \in R^G} \sum_{p \in P^r} \left( \hat{c}_p^r - \sum_{i \in N^G} \lambda_i^G a_{pi}^r - \sum_{k \in K} \sum_{i \in N^G} \gamma_i^k e_p^{rk} \right) x_p^r +$$

$$\sum_{i \in N^C} (f_i - \lambda_i^C) y_i + \sum_{i \in N^G} \lambda_i^G g_i^G + \sum_{k \in K} \sum_{i \in N^G} \gamma_i^k d_i^k;$$

s.t. $\sum_{p \in P_r} x_p^r = 1, \forall r \in R^G;$ $x_p^r \in \{0, 1\}, \forall r \in R^G, p \in P_r;$ and $y_i \in \{0, 1\}, \forall i \in N^C;$ where $\lambda_i^G$, $\gamma_i^k$ are respectively a Lagrange multiplier, indicating the cost generated when general crew members undertake the crew task i.

After the the first sub-model and the second sub-model are relaxed, the model becomes a classic shortest path problem. The solution method of the shortest path problem can be used to find a lower bound of the two problems, and a feasible crew pairing is added to a column pool, and then a commercial solving software is configured to solve the original problem to obtain an upper bound, then an interval between the upper bound and the lower bound is calculated, and whether a condition of ending the Lagrangian relaxation algorithm is met is determined. If yes, the Lagrangian relaxation algorithm is ended; otherwise, the Lagrangian multipliers are updated, and the lower bound and the upper bound are found continuously to meet the condition until the Lagrangian relaxation algorithm is ended. An overall solution flow of the problem is shown in FIG. 3.

(i) The crew task coverage constraint in the first sub-model, the second crew task coverage constraint in the second sub-model and the crew member preference constraint are relaxed to form a Lagrangian relaxation problem.

(ii) The number of iterations q is initialized to 1.

The Lagrangian multipliers $\lambda_i^C$, $\lambda_i^G$ and $\gamma_i^k$ are initialized to 0.

An initial iteration step size $\alpha^q$ is set as k/(q+1), the maximum number of iterations $Q_{max}$ and the minimum upper bound-lower bound interval $\in_{min}$ are set.

(iii) The Lagrangian relaxation problem is solved using a shortest path solution method to obtain a lower bound of the first sub-model, and a lower bound of the second sub-model. The feasible crew pairing is added to the column pool.

(iv) Based on continuous update of the column pool, the original problem is solved with commercial solving software to obtain an upper bound.

(v) An interval between the upper bound and the lower bound of the original problem, and whether the condition of ending the Lagrangian relaxation algorithm is met is determined. If yes, the Lagrangian relaxation algorithm is ended; otherwise, step (vi) is performed.

(vi) The Lagrangian multipliers are updated using a subgradient method; and step (iii)-(v) are repeated.

Figure 5:
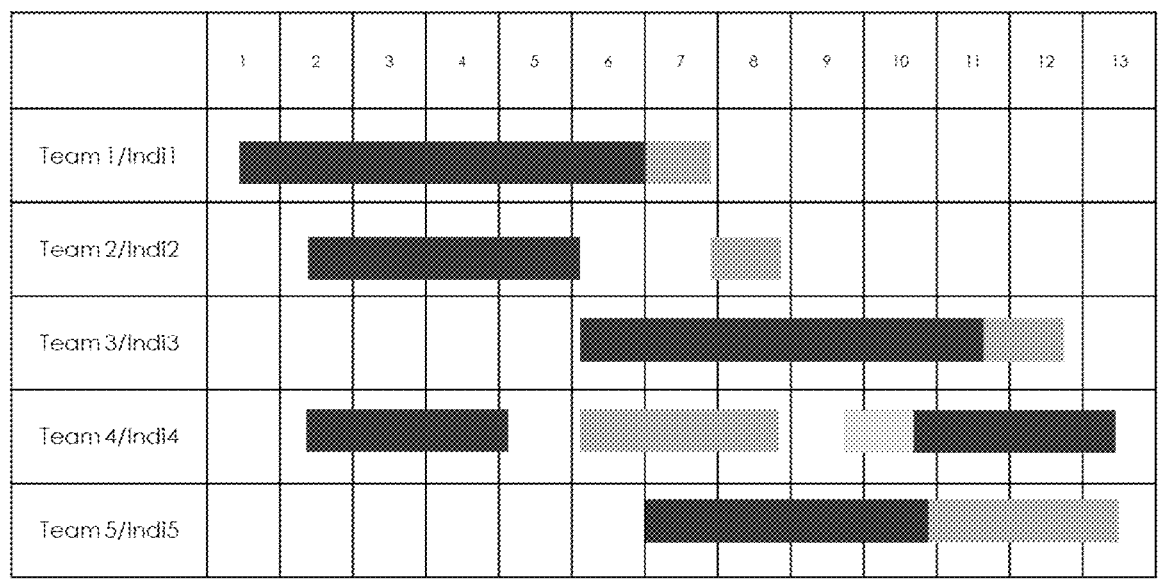
FIG. 5 shows a crew scheduling output by the device according to an embodiment of the disclosure.

The crew scheduling plan output by the device can be expressed in a graphical form (as shown in FIG. 5), which is more intuitive and facilitates the operation compared to the data form.

In order to realize the objection mentioned above, the present disclosure provides an electronic device, which includes a processor, a memory and a computer program. The computer program is stored on the memory and is configured to be executed by the processor to implement the method for optimizing crew replanning for high-speed railway typical scenarios.

In order to realize the objection mentioned above, the present disclosure also provides a computer-readable storage medium. The computer-readable storage medium stores a computer program, and the computer program is configured to be executed by a processor to implement the method for optimizing crew replanning for high-speed railway typical scenarios.

Compared to the prior art, the present disclosure has the following beneficial effects.

(1) Compared with the traditional manual crew replanning, the present disclosure constructs an optimization model and solves the problem to greatly improve an efficiency of crew replanning;

(2) the deviation of the crew replanning, the number of times adding the crew member as a passenger, the matching preference of the crew member and deviated monthly working hours of the crew member are comprehensively considered to construct the model, which causes the crew replanning more scientific and reasonable; and (3) the Lagrangian relaxation algorithm designed by the present disclosure can be used to solve the model of crew replanning, which has an excellent versatility, good solution quality and high solution efficiency.

Those of general skill in the art can realize that the modules and algorithm steps described in conjunction with the embodiments disclosed herein can be implemented in electronic hardware, or a combination of computer software and electronic hardware. Whether these functions are performed in hardware or software depends on the specific application and designed constraints of the technical solution. Those skilled in the art may implement the described functionality using different methods for each particular application, and such implementations should be considered within the scope of the present disclosure.

Those skilled in the art can clearly understand that, for the convenience and brevity of description, the specific working process of the apparatuses and devices can refer to the corresponding processes in the method embodiments, thus, it will not be repeated here.

In the embodiments, it should be understood that the disclosed apparatus and method may be implemented in other manners. The apparatus embodiments are only illustrative, and are not intended to limit the scope of the present disclosure. For example, the division of the modules is only a logical function division. In actual implementation, there may be other division methods; multiple modules or components may be combined or can be integrated into another system, or some features can be ignored, or not implemented. On the other hand, the shown or discussed mutual coupling, direct coupling or communication connection may be through some interfaces, indirect coupling or communication connection of devices or modules can be in electrical, mechanical or other forms.

The modules described as a separate component may or may not be physically separated, and a component shown as a module may or may not be a physical module, that is, may be located in one place or distributed to multiple network modules. Some or all of the modules may be selected according to actual requirements to achieve the purpose of the solutions of the embodiments of the present disclosure.

In addition, each functional module in the embodiments of the present disclosure may be integrated into one processing module or exist physically alone, or two or more modules may be integrated into one module.

If the functions are implemented in a form of a software function module and sold or used as an independent product, they can be stored in a computer-readable storage medium. Based on such understanding, the technical solution of the present disclosure, the part that contributes to the prior art or the part of the technical solution can be embodied in the form of a software product in essence. The computer software product is stored in a storage medium, including several instructions to cause a computer device (which may be a personal computer, a server or a network device) to execute all or part of the steps of the method for transmitting/receiving an energy-saving signal according to various embodiments of the present disclosure. The storage medium includes a universal serial bus (USB), a removable hard disk, a read-only memory (ROM), a random access memory (RAM), a magnetic disk, an optical disk or other mediums that can store program codes.

Described above are only preferred embodiments and technical principle of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

It should be understood that the sequence numbers of the steps in the content of the present disclosure do not absolutely indicate the sequence of execution, and the execution sequence of each process should be determined by its functions and internal logic. Therefore, these sequence numbers should not be considered as limitation to the implementation of the embodiment of the disclosure.

What is claimed is:

1. A computer-implemented method of crew replanning for multiple high-speed railway typical scenarios, comprising:
building a high-speed railway crew connection network;
establishing a model for high-speed railway crew replanning;
decomposing the model into a first sub-model for team leaders and a second sub-model for general crew members; and
designing a Lagrangian relaxation algorithm to solve the first sub-model and the second sub-model;
automatically generating a replanned crew schedule based on results for the first sub-model for the team leaders and the second sub-model for the general crew members; and
automatically transmitting the replanned crew schedule in real time to the team leaders and the general crew members, such that up-to-date information in the replanned crew schedule is notified to each crew member;
wherein the railway crew connection network is built through steps of:
performing node establishment; and
establishing a connection arc;
wherein the node establishment comprises steps of:
denoting a day before a start of a scheduling cycle as d=0;
denoting moment 0:00 of d=0 as time zero, in minutes; wherein for $\forall e \in E$, a start time $t_{d_e}^{start}$ is expressed as $t_{d_e}^{start} = t_e^{start} + 1440 \times d_e$, and an end time $t_{d_e}^{end}$ is expressed as $t_{d_e}^{end} = t_e^{end} + 1440 \times d_e$; for $\forall e_T \in E_T$, a start time $t_{d_{e_T}}^{start}$ is expressed as $t_{d_{e_T}}^{start} = t_{e_T}^{start} + 1440 \times d_{e_T}$, and an end time $t_{d_{e_T}}^{end}$ is expressed as $t_{d_{e_T}}^{end} = t_{d_{e_T}}^{end} + 1440 \times d_{e_T}$; and
establishing nodes respectively corresponding to an initial state of each crew member, a crew duty of each day within the scheduling cycle and a replanning crew duty according to schedule day;
the node establishment further comprises:
establishing virtual crew base source nodes $m_1^O$, $m_2^O$, ..., $m_n^O$ for all crew bases in a crew area involved in crew scheduling, respectively, and denoting a set of the virtual crew base source nodes as $V_O$; wherein there is a unique crew base for $\forall r \in R$;
establishing virtual crew base end nodes $m_1^D, m_2^D, \ldots, m_n^D$ for all crew bases in the crew area involved in the crew scheduling, respectively, and denoting a set of the virtual crew base end nodes as $V_D$; and
for $\forall e \in E$, $d_e \in \{d|d=1 \ldots N_D-1\}$ and $\forall e_T \in E_T$, $d_{e_T} \in \{d|d=1 \ldots N_D-1\}$, establishing an intermediate node $v_e^d$ corresponding to the crew duty and an intermediate node $V_{e_T}^d$ of the replanning crew duty; wherein the intermediate node $v_e^d$ and the intermediate node $v_{d_T}^d$ each has seven attributes, respectively start position, start time, end position, end time, duration, schedule day serial number and crew preference;
locating, by a global positioning system (GPS), a start position and an end position of each crew member during the crew duty to determine the start position and the end position of the intermediate node corresponding to the crew duty;
denoting a set of intermediate nodes of all crew duties in the scheduling cycle as $V_{mid}^E$;
denoting a set of intermediate nodes of all replanning crew duties as $V_{mid}^T$;
denoting a set of all intermediate nodes as $V_{mid}$; and
denoting a set of all nodes as V;
wherein R represents a set of all crew members; r is any one of all crew members; D is a set of all schedule days in the scheduling cycle, $D=\{d|d=1, 2, 3, \ldots, N_D\}$, wherein d is any one of the schedule days, and $N_D$ is the total number of days in the scheduling cycle;
E represents a set of all crew duties in the scheduling cycle; e is any one of all crew duties; $t_e^{start}$ is a start time of the crew duty e; $t_e^{end}$ is an end time of the crew duty e; $t_e$ is a duration of the crew duty e; and $d_e$ represents a schedule day serial number of the crew duty e;
$E_T$ represents a set of all replanning crew duties in the scheduling cycle; $e_T$ is any one of all replanning crew duties; $t_{e_T}^{start}$ represents a start time of the replanning crew duty $e_T$; $t_{e_T}^{end}$ represents an end time of the replanning crew duty $e_T$; $t_{e_T}$ represents a duration of the replanning crew duty $e_T$; and $d_{e_T}$ represents a schedule day serial number of the replanning crew duty $e_T$; and
$m_n$ represents crew base, wherein n is a positive integer;
wherein the connection arc is established as follows:
a) for $\forall r \in R$, if a crew base to which the crew member r belongs is the same as a start position of $\forall e \in E$ and $\forall e_T \in E_T$, and the crew member r conforms to a preference of $\forall e \in E$ and $\forall e_T \in E_T$ for crew member, establishing a crew On-duty arc $(m_n^o, v_e^d)$ between a virtual crew base source node $m_n^o$ and the intermediate node $v_e^d$, or establishing a crew On-duty arc $(m_n^o, v_{e_T}^d)$ between the virtual crew base source node $m_n^o$ and the intermediate node $v_{e_T}^d$; and
denoting a set of all crew On-duty arcs as $A_{On\text{-}duty}$;
b) from the schedule day d=0 to schedule day $d=N_D-1$, for any one-day crew duty and replanning crew duty, if an end position of a previous crew duty is the same as a start position of a next crew duty, establishing a crew connection arc $(v_{e_1}^d, v_{e_2}^d)$ between an intermediate node $v_{e_1}^d$ and an intermediate node $v_{e_2}^d$ a crew connection arc $(v_{e_T}^d, v_e^d)$ between the intermediate node $v_{e_T}^d$ and the intermediate node $v_e^d$, or a crew connection arc $(v_e^d, v_{e_T}^d)$ between the intermediate node $v_e^d$ and the intermediate node $v_{e_T}^d$; and
denoting a set of all crew connection arcs as $A_{connection}$;
c) from the schedule day d=0 to the schedule day $d=N_D-1$, for $\forall r \in R$, when the end position of an intermediate node, which crew r completed, is different from a start position of the next intermediate node to be completed but the same as a start position of the another intermediate node, establishing a deadheading arc $(v_{e_1}^d, v_{e_2}^d)$ between the intermediate node $v_{e_1}^d$ and the intermediate node $v_{e_2}^d$, a deadheading arc $(v_{e_T}^d, v_e^d)$ between the intermediate node $v_{e_T}^d$ and the intermediate node $v_e^d$, or a deadheading arc $(v_e^d, v_{e_T}^d)$ between the intermediate node $v_e^d$ and the intermediate node $V_e^l$; and
denoting a set of all deadheading arcs as $A_{deadheading}$;
d) for $\forall r \in R$, if the crew base to which the crew member r belongs is the same as an end position of $\forall e \in E$ and $\forall e_T \in E_T$ and the crew member r conforms to the preference of $\forall e \in E$ and $\forall e_T \in E_T$ for crew member, establishing a crew Off-duty arc $(v_e^d, m_n^D)$ between a virtual crew base end node $m_n^D$ and the intermediate node $v_e^d$, or a crew Off-duty arc $(v_{e_T}^d, m_n^D)$ between the virtual crew base end node $m_n^D$ and the intermediate node $v_{e_T}^d$; and
denoting a set of all crew Off-duty arcs as $A_{Off\text{-}duty}$; and
e) denoting a set of all arcs as A;

wherein the high-speed railway crew connection network is expressed as N(V,A).

2. The method of claim 1, wherein the step of "establishing a model for high-speed railway crew replanning" comprises:
establishing an objective function of the model;
wherein an optimization objective of the model is to minimize cost of an replanned crew scheduling, and the objective function is expressed as:

$$\min \sum_{r \in R} \sum_{p \in P_r} c_p^r x_p^r + \sum_{i \in N^C} f_i y_i + \sum_{r \in R^G} \sum_{i \in N^G} h_i^r z_i^r;$$

wherein $N^C$ is a set of crew tasks of all crew members; $N^G$ is a set of crew tasks of general crew members; $P_r$ represents a set of feasible crew pairings for the crew member r; p is any one of the crew pairings; $c_p^r$ represents cost required for the crew pairing $p \in p_r$; $x_p^r$ is a 0-1 decision variable; if the crew member $r \in R$ undertakes the crew pairing $p \in p_r$, $x_p^r$ is equal to 1; otherwise, $x_p^r$ is equal to 0; i represents crew task, $f_i$ represents a penalty cost when the crew task i is assigned to one less crew member, and one less crew member is allowed; $y_i$ is a 0-1 decision variable, wherein if one less crew member is assigned to perform the crew task $i \in N^C$, $y_i$ is equal to 1; otherwise, $y_i$ is equal to 0; $R^G$ is a set of the general crew members; $h_i^r$ represents a penalty cost when the crew member r does not undertake the crew task i with a corresponding leader; and $z_i^r$ is a 0-1 decision variable, wherein if the crew member $r \in R^G$ does not undertake the crew task $i \in N^G$ with the corresponding leader, $z_i^r$ is equal to 1; otherwise, $z_i^r$ is equal to 0;
the cost $c_p^r$ is calculated as follows:

$$c_p^r = \alpha_r + \sum_{i \in N_p} \beta_i b_{pi}^r + \sum_{i \in N_p} \mu_i a_{pi}^r + \eta_r \delta_p^r;$$

wherein $\alpha_r$ represents a penalty value for the crew member r when deviating from an original crew pairing; $N_P$ represents a set of crew tasks included in the crew pairing p; $\beta_i$ represents a cost when crew members deadhead as passengers to the crew task; $b_{pi}^r$ is a 0-1 variable, wherein if the crew member r is added as a passenger to the crew task i in the crew pairing p, $b_{pi}^r$ is equal to 1; otherwise, $b_{pi}^r$ is equal to 0; $u_i$ represents a cost of matching preference of the crew task i; $a_{pi}^r$ is a 0-1 variable, wherein if the crew pairing $p \in P_r$ comprises the crew task $i \in N$, $a_{pi}^r$ is equal to 1; otherwise, $a_{pi}^r$ is equal to 0; $\eta_r$ represents a penalty coefficient of deviated monthly working hours of the crew member r; and $\delta_p^r$ represents deviated monthly working hours of the crew member r when undertaking the crew pairing p.

3. The method of claim 2, wherein the step of "establishing a model for high-speed railway crew replanning" further comprises:
establishing constraints for the model;
wherein the constraints include:
a) for $\forall r \in R$, the crew member r is allowed to choose only one crew pairing during the scheduling cycle, expressed as follows:

$$\sum_{p \in P_r} x_p^r = 1, \forall r \in R;$$

b) for all crew tasks of a leader, all crew tasks of the crew members and all crew tasks of safety personnel, there is a matching crew member, expressed as follows:

$$\sum_{r \in R^L} \sum_{p \in P_r} a_{pi}^r x_p^r = g_i^L, \forall i \in N^L;$$

$$\sum_{r \in R^C} \sum_{p \in P_r} a_{pi}^r x_p^r + y_i = g_i^C, \forall i \in N^C; \text{ and}$$

$$\sum_{r \in R^S} \sum_{p \in P_r} a_{pi}^r x_p^r = g_i^S, \forall i \in N^S;$$

c) when arranging a task with crew preference, it is needed to meet the crew preference, expressed as follows:

$$\sum_{r \in R^G} \sum_{p \in P_r} e_{pi}^{rk} x_p^r \geq d_i^k, \forall k \in K, i \in N^G;$$

d) a leader-crew matching constraint, expressed as follows:

$$\sum_{p \in P_r} a_{pi}^r x_p^r - \sum_{p \in P_{\pi(r)}} a_{p\sigma(i)}^{\pi(r)} x_p^{\pi(r)} \leq z_i^r, \forall r \in R^G, i \in N^G;$$

wherein when the crew member $r \in R^G$ does not undertake the crew task $i \in N^G$ together with the corresponding leader $\pi(r)$, $z_i^r = 1$; and e) a decision variable constraint:

$x_p^r \in \{0,1\}, \forall r \in R, p \in P_r;$ $y_i \in \{0,1\}, \forall i \in N^C;$ and $z_i^r \in \{0,1\}, \forall r \in R^G, i \in N^G;$ wherein $R^L$ represents a set of leaders; $g_i^L$ represents the number of leaders required to undertake the crew task $i \in N$; $N^L$ represents a set of crew tasks of the leader; $R^C$ represents a set of cabin; $g_i^C$ represents the number of cabins required to undertake the crew task $i \in N$; $R^S$ represents a set of the safety personnel; $g_i^S$ represents the number of safety personnel required to undertake the crew task $i \in N$; $N^S$ represents a set of crew tasks of the safety personnel; $e_{pi}^{rk}$ represents a known 0-1 variable, which indicates that the crew task $i \in N^G$ in the crew pairing p has a preference $k \in K$ for the crew member r; if the preference points to males, when the crew member r is male, $e_{pi}^{rk}$ is equal to 1; otherwise, $e_{pi}^{rk}$ is equal to 0; $d_i^k$ represents a threshold of the preference k of the crew task i; if the preference k points to males, the threshold is equal to the number of male crew members required by the crew task i; K represents a set of preferences of the crew task to crew member assignment; k is any one of the set of preferences; $\pi(r)$ represents the leader in a crew team corresponding to any general crew member $r \in R^G$, and $\pi(r) \in R^L$; $P_{\pi(r)}$ represents a set of feasible crew pairings of a leader $\pi(r)$ corresponding to the crew member r;

$a_{P\sigma(i)}^{\pi(r)}$ is a 0-1 variable, wherein if the crew pairing $p \in P_{\pi(r)}$ comprises a crew task $\sigma(i) \in N$, $a_{P\sigma(i)}^{\pi(r)}$ is equal to 1; otherwise, $a_{P\sigma(i)}^{\pi(r)}$ is equal to 0; and $x_p^{\pi(r)}$ is a 0-1 decision variable, wherein if the crew pairing p undertaken by the leader $\pi(r)$ corresponding to the crew member $r \in R$ belongs to $P_{\pi(r)}$, $x_p^{\pi(r)}$ is equal to 1; otherwise, $x_p^{\pi(r)}$ is equal to 0.

4. The method of claim 2, wherein the first sub-model is configured to complete leader crew tasks, and an optimization objective of the first sub-model is to minimize a cost of completing the leader crew tasks in the adjusted crew scheduling plan, expressed as $$\min \sum_{r \in R^L} \sum_{p \in P_r} c_p^r x_p^r;$$

wherein constraints of the first sub-model include:
a) any one of leaders is allowed to choose only one crew pairing during the scheduling cycle, expressed as follows:

$$\sum_{p \in P_r} x_p^r = 1, \forall r \in R^L;$$

b) a crew task coverage constraint, wherein for any of the leader crew tasks, there is a matching leader to undertake, expressed as follows:

$$\sum_{r \in R^L} \sum_{p \in P_r} a_{pi}^r x_p^r = g_i^L, \forall i \in N^L;$$

c) a decision variable constraint, expressed as follows:

$x_p^r \in \{0,1\}, \forall r \in R^L, p \in P_r;$ wherein the second sub-model is configured to complete the crew tasks of general crew members, and an optimization objective of the second sub-model is to minimize a cost of completing the crew tasks of general crew members in the adjusted crew scheduling plan, expressed as follows:

$$\min \sum_{r \in R^G} \sum_{p \in P_r} \hat{c}_p^r x_p^r + \sum_{i \in N^C} f_i y_i;$$

wherein since the scheduling of the leader is determined after the first sub-model is solved, a value of $z_i^r$ can be determined according to the scheduling of the general crew members, so as to obtain a cost $\hat{c}_p^r$ for an general crew member r to undertake the crew pairing p expressed as:

$$\hat{c}_p^r = c_p^r + \sum_{i \in N_p} h_i^r z_i^r;$$

constraints of the second sub-model include:
a) any general crew member r is allowed to choose only one crew pairing during the scheduling cycle, expressed as follows:

$$\sum_{p \in P_r} x_p^r = 1, \forall r \in R^G;$$

b) a crew task coverage constraint, wherein for any of the crew tasks of general crew members, there is a matching general crew member to undertake, expressed as follows:

$$\sum_{r \in R^C} \sum_{p \in P_r} a_{pi}^r x_p^r + y_i = g_i^C, \forall i \in N^C; \text{ and}$$

$$\sum_{r \in R^S} \sum_{p \in P_r} a_{pi}^r x_p^r = g_i^S, \forall i \in N^S;$$

c) a crew member preference constraint, wherein when arranging a crew task with a crew member preference, it is needed to meet the crew member preference, expressed as follows:

$$\sum_{r \in R^G} \sum_{p \in P_r} e_{pi}^{rk} x_p^r \geq d_i^k, \forall k \in K, i \in N^G;$$

and
d) a decision variable constraint, expressed as follows:

$x_p^r \in \{0,1\}, \forall r \in R^G, p \in P_r;$ and $y_i \in \{0,1\}, \forall i \in N^C.$

5. The method of claim 4, wherein in the step of designing a Lagrangian relaxation algorithm to solve the first sub-model and the second sub-model, the crew task coverage constraint in the first sub-model is relaxed and added into the objective function as a penalty item, and the crew task coverage constraint in the second sub-model and the crew member preference constraint are relaxed and added into the objective function as penalty items;

wherein the first sub-model with the crew task coverage constraint relaxed is expressed as:

$$\Theta^L(\lambda) = \sum_{r \in R^L} \sum_{p \in P^r} \left( c_p^r - \sum_{i \in N^L} \lambda_i^L a_{pi}^r \right) x_p^r + \sum_{i \in N^L} \lambda_i^L g_i^L;$$

s.t. $\sum_{p \in P_r} x_p^r = 1, \forall r \in R^L;$ and $x_p^r \in \{0, 1\}, \forall r \in R^L, p \in P_r;$ wherein $\lambda_i^L$ is a Lagrange multiplier, indicating a cost generated when the leader L undertakes the crew task i;

the second sub-model with the crew task coverage constraint and the crew member preference constraint relaxed is expressed as:

$$\Theta^G(\lambda, \gamma) = \sum_{r \in R^G} \sum_{p \in P^r} \left( \hat{c}_p^r - \sum_{i \in N^G} \lambda_i^G a_{pi}^r - \sum_{k \in K} \sum_{i \in N^G} \gamma_i^k e_{pi}^{rk} \right) x_p^r +$$
$$\sum_{i \in N^C} (f_i - \lambda_i^C) y_i + \sum_{i \in N^G} \lambda_i^G g_i^G + \sum_{k \in K} \sum_{i \in N^G} \gamma_i^k d_i^k;$$

s.t. $\sum_{p \in P_r} x_p^r = 1, \forall r \in R^G;$

-continued $x_p^r \in \{0, 1\}, \forall r \in R^G, p \in P_r$; and $y_i \in \{0, 1\}, \forall i \in N^C$;

wherein $\lambda_i^C$, $\lambda_i^G$ and $\gamma_i^k$ are respectively a Lagrange multiplier, indicating the cost generated when general crew members undertake the crew task i.

6. The method of claim 5, wherein the first sub-model and the second sub-model are solved using the Lagrangian relaxation algorithm through steps of:

(i) relaxing the crew task coverage constraint in the first sub-model, the crew task coverage constraint in the second sub-model and the crew member preference constraint to form a Lagrangian relaxation problem;

(ii) initializing the number of iterations q to 1; initializing Lagrangian multipliers $\lambda_i^C$, $\lambda_i^G$, $\gamma_i^k$ to 0; and setting an initial iteration step size $\alpha^q$ as k/(q+1), setting the values for the maximum number of iterations $Q_{max}$ and a minimum upper bound-lower bound interval $\varepsilon_{min}$;

(iii) solving the Lagrangian relaxation problem using a shortest path solution method to obtain a lower bound of the first sub-model and a lower bound of the second sub-model; adding the feasible crew pairing to a column pool;

(iv) based on continuous update of the column pool, solving original problem to obtain an upper bound;

(v) calculating an interval between the upper bound and the lower bound of the original problem and determining whether the Lagrangian relaxation algorithm ending condition is met;

if yes, ending the Lagrangian relaxation algorithm;

otherwise, proceeding to step (vi); and (vi) updating the Lagrangian multipliers using a subgradient method; and returning to step (iii).

* * * * *